United States Patent
Osman et al.

(10) Patent No.: US 10,360,877 B2
(45) Date of Patent: Jul. 23, 2019

(54) METHODS FOR OPTIMIZING POSITIONING OF CONTENT ON A SCREEN OF A HEAD MOUNTED DISPLAY

(71) Applicant: Sony Interactive Entertainment Inc., Tokyo (JP)

(72) Inventors: Steven Osman, San Mateo, CA (US); Richard Marks, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 90 days.

(21) Appl. No.: 15/268,482

(22) Filed: Sep. 16, 2016

(65) Prior Publication Data

US 2017/0092235 A1 Mar. 30, 2017

Related U.S. Application Data

(60) Provisional application No. 62/235,351, filed on Sep. 30, 2015.

(51) Int. Cl.
| | |
|---|---|
| *G09G 5/38* | (2006.01) |
| *G06F 3/01* | (2006.01) |
| *G06F 3/16* | (2006.01) |
| *G06T 19/00* | (2011.01) |
| *G02B 27/01* | (2006.01) |

(52) U.S. Cl.
CPC ............. *G09G 5/38* (2013.01); *G02B 27/017* (2013.01); *G06F 3/012* (2013.01); *G06F 3/013* (2013.01); *G06F 3/16* (2013.01); *G06T 19/006* (2013.01); *G02B 2027/0181* (2013.01); *G09G 2320/0693* (2013.01); *G09G 2354/00* (2013.01)

(58) Field of Classification Search
CPC .......... G02B 27/017; G02B 2027/0181; G06F 3/012; G06F 3/16; G06T 19/006; G09G 2320/0693; G09G 2340/00; G09G 2354/00
See application file for complete search history.

(56) References Cited

U.S. PATENT DOCUMENTS

| | | | |
|---|---|---|---|
| 9,779,702 B2 * | 10/2017 | Matsuyama | G09G 5/38 |
| 2003/0058543 A1 * | 3/2003 | Sheedy | G02B 27/0172 |
| | | | 359/630 |
| 2009/0128482 A1 * | 5/2009 | Richardson | G06F 3/012 |
| | | | 345/156 |
| 2010/0091027 A1 * | 4/2010 | Oyama | G02B 27/0068 |
| | | | 345/581 |
| 2012/0050493 A1 * | 3/2012 | Ernst | G02B 27/017 |
| | | | 348/47 |
| 2012/0120103 A1 * | 5/2012 | Border | G02B 27/017 |
| | | | 345/633 |

(Continued)

*Primary Examiner* — Yu Chen
(74) *Attorney, Agent, or Firm* — Penilla IP, APC

(57) ABSTRACT

A system and method of adjusting content displayed to a user during an interactive HMD session to compensate for the user's head tilt. The user's head tilt causes the displayed content to be displayed offset from the user's comfortable viewing area of the screen in the HMD. The offset is determined a number of ways and then the displayed images are adjusted to reduce or substantially eliminate the offset. The adjusting can compensate for different user postures for standing, sitting, reclining, lying down, etc. as may occur during an interactive HMD session. The user's head tilt can be caused by the user's physical posture, physical shape or due to corrective lenses that cause the user to inadvertently tilt his head.

26 Claims, 14 Drawing Sheets

(56) References Cited

U.S. PATENT DOCUMENTS

| | | | | |
|---|---|---|---|---|
| 2014/0160170 A1* | 6/2014 | Lyons | ................ | G09G 5/38 |
| | | | | 345/676 |
| 2014/0333665 A1* | 11/2014 | Sylvan | ............ | G02B 27/0149 |
| | | | | 345/633 |
| 2016/0343344 A1* | 11/2016 | Chae | ................ | G09G 5/003 |
| 2017/0061936 A1* | 3/2017 | Matsuyama | ......... | G06T 19/006 |
| 2017/0091549 A1* | 3/2017 | Gustafsson | ....... | G06K 9/00604 |
| 2017/0358280 A1* | 12/2017 | Matsuyama | ........... | G09G 5/00 |

\* cited by examiner

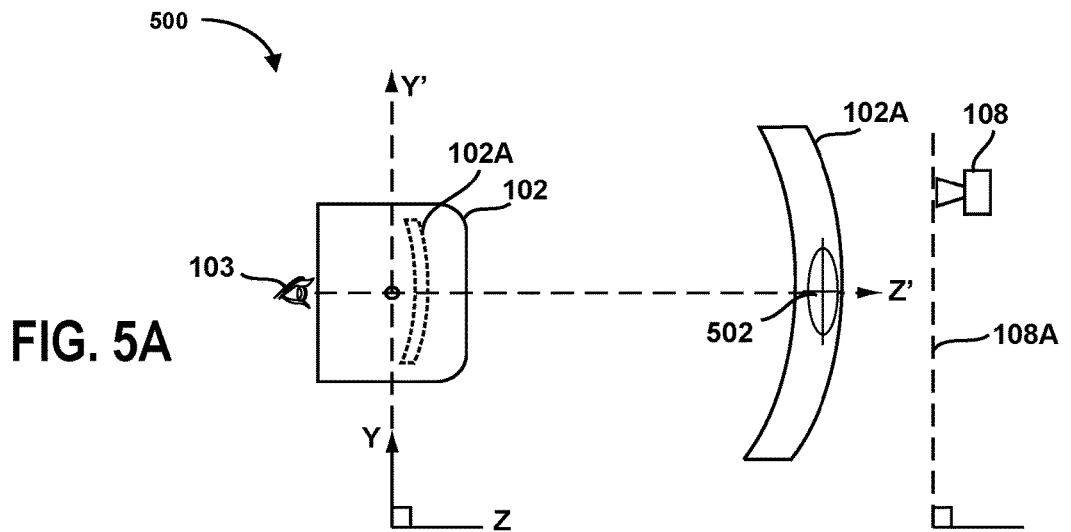
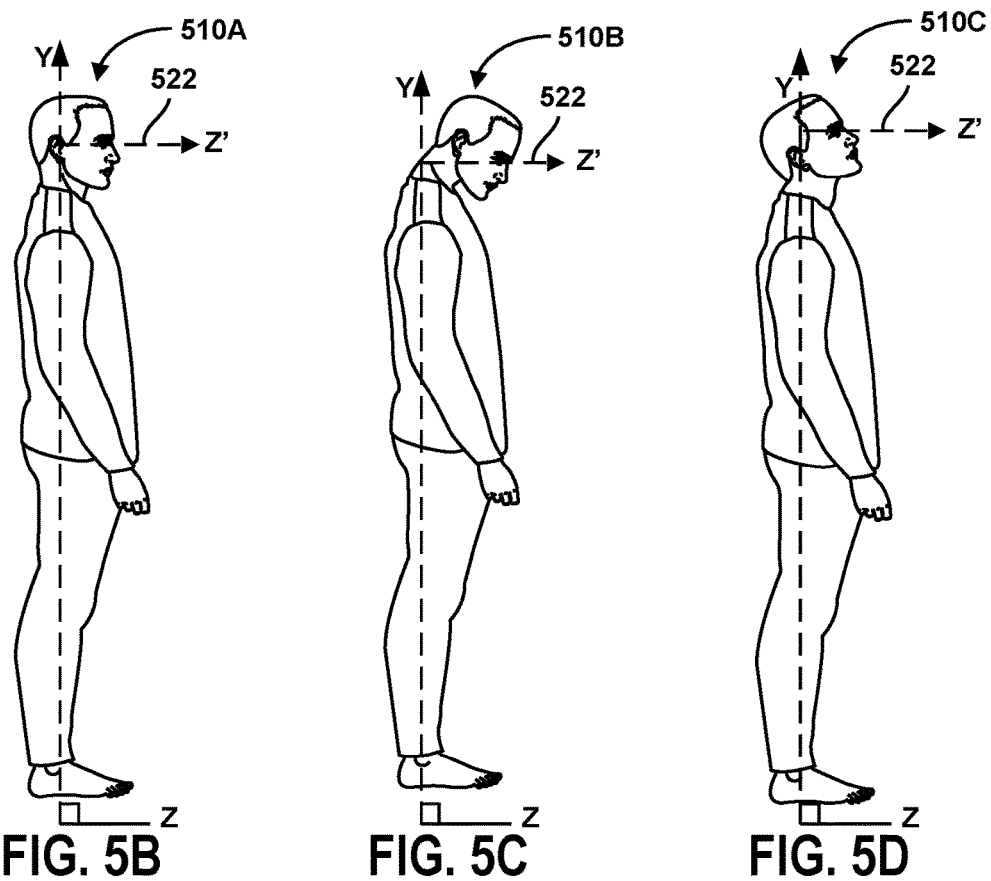
FIG. 5A
FIG. 5B  FIG. 5C  FIG. 5D

METHODS FOR OPTIMIZING POSITIONING OF CONTENT ON A SCREEN OF A HEAD MOUNTED DISPLAY

CLAIM OF PRIORITY

The present application claims priority from U.S. Provisional Patent Application No. 62/235,351, filed on Sep. 30, 2015, entitled "METHODS FOR OPTIMIZING POSITIONING OF CONTENT ON A SCREEN OF A HEAD MOUNTED DISPLAY," which is incorporated herein by reference.

TECHNICAL FIELD

The present disclosure relates generally to virtual environments, and more particularly, to methods and systems for optimizing placement of content on a screen of a head mounted display (HMD) based detection of a user's viewing orientation and/or based on viewing orientations made by users with corrective lenses.

DESCRIPTION OF RELATED ART

One of the rapidly growing technologies in the field of human-computer interaction is various head-mounted displays (HMDs), which may be worn on a user's head and which have one or two displays in front of the one or two of the user eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

Although much advancement has occurred in the HMD field, the technology still needs advancement to bring physical reality to real user interactions with virtual objects rendered in virtual environments presented in HMDs.

It is in this context that the following embodiments arise.

SUMMARY

Broadly speaking, the present disclosure fills these needs by providing a system and method for dynamically adjusting the image displayed on a screen in the HMD to compensate for a head tilt of the user wearing the HMD. As will be described, head tilt can be due to a user wearing corrective glasses, glasses with bifocals, or due to a user's viewing posture. In the various examples, when a user tilts his head to view directly, the user may be doing so to avoid directly viewing through a bifocal line of his or her corrective glasses. In some cases, a user may not be intestinally avoiding a bifocal line, but due to habit or tendency, the user may still tend to tilt his or her head (e.g., down), to mimic looking over the top portion of the glasses bifocal line. In other cases, users may tilt their head up or even sideways, or any variation of head tilt. In one configuration, a calibration process can be done to detect an amount of head tilt made by a given user, and once this tilt is quantified, e.g., by an offset, an adjustment can be made to the content displayed on the HMD so that tilt is eliminated, minimized or reduced, thus providing for a more comfortable viewing posture for the user. Another benefit of adjusting the content, e.g., by shifting the content up, down, at an angle, etc., is that when users are asked to focus on specific content (e.g., in a game or application), the user's head movement will be consistent with the intended direction. As such, more accuracy is provided to the user, such that movements made with the HMD to focus on specific content will be more accurately directed toward the content or objects in a scene that the user is require to look at, interface with, gaze at, or select by viewing, or combinations thereof.

It should be appreciated that the present disclosure can be implemented in numerous ways, including as a process, an apparatus, a system, computer readable media, or a device. Several inventive embodiments of the present disclosure are described below.

One embodiment provides a virtual reality system including a head mounted display coupled to a computing device capable of generating the virtual reality environment including multiple virtual reality scenes that are rendered and displayed on the HMD. The computing device can include an input device interface for receiving input from a user input device or the HMD. The input device interface processes instructions to select content for display in the HMD. The computing device can also include a virtual reality space generation module for rendering the selected content in the HMD in a form of a virtual reality scene and an HMD movement module. The HMD movement module can be provided to tracking movement of the HMD in a real space. In some embodiments, tracking can be done using inertial sensors integrated in the HMD. In other embodiments, the tracking can be done using images captured of the HMD, e.g., LEDs placed on the HMD or other markers. Still further, tracking can be done by both inertial tracking and image tracking. In one configuration, tracking can be done to identify a first position and pose of the HMD in the real space. The HMD movement module can also identify a second position and pose of the HMD when the user is viewing a specific object of interest (e.g., content on in a scene, a target reticle, etc.). In one embodiment, an offset is identified between the first position and the second position, which signals an amount of compensating head tilt made by the user when viewing the specific object of interest. Using offset, content on rendered in a scene can be adjusted or shifted, so that the user need not apply the head tilt or not as much head tilt to view the object. In some embodiments, by adjusting the scene using the offset, it is possible to better correlate content displayed to the user, so that the system can know when the user is looking at specific content displayed in the HMD.

An advantage is that the when the user is intending to look at specific content in a scene, the user's head movement will correspond to the location or content that the user is intending to look at. As an example, in applications or games that require the user to look or gaze at specific content, the user will move his or her head to look to the specific location. By knowing the user's offset, it is possible to correct the positioning of content in the scene so that the user can accurately view, look, gaze or identify the content of interest. As mentioned above, the offset can be measured during a calibration stage, and the offset can be saved to the user's profile. In other methods, the offset can be measured dynamically or passively, during user interaction with content. For example, when the system notices that the user is not accurately looking or gazing at specific content, background measurements of the offset can take place. Over time, if the offset is repeated, it can be assumed with a level of certainty that the user indeed has an offset due to head tilt. This adjustment in scene content is a technical advance, which avoids providing an HMD system that is not accurately matched to a user's natural pose or head tilt habits nor account for users with corrective glasses. It should be understood, however, that the user's head tilt or habits of viewing with certain head tilts may not be due only to wearing corrective glasses, as some people just have a habit of head tilting.

One embodiment provides a method for optimizing positioning of a scene when displayed on a screen of a head mounted display (HMD). The method can include detecting an initial orientation of the HMD in three-dimensional space, the initial orientation of the HMD being a comfort viewing position of a user. An object is rendered in the scene at a selected location in the scene displayed on the screen of the HMD. The user is prompted to observe the displayed object and a directed orientation of the HMD is detected. An offset in three-dimensional space between the initial orientation and the directed orientation can be determined. The offset can be applied to adjust positioning of a subsequent scene that is displayed in the screen of the HMD. The offset can also be saved to the user's profile so as to allow the offset to be recalled whenever the user is using the HMD. The offset can be constantly monitored and adjusted during the user's use of the HMD.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The present disclosure will be readily understood by the following detailed description in conjunction with the accompanying drawings.

FIG. 5A illustrates the HMD, during use, in accordance with the disclosed embodiments.

FIGS. 5B-5D illustrate different human physical postures, in accordance with the disclosed embodiments.

DETAILED DESCRIPTION

Several exemplary embodiments for dynamically adjusting the image displayed on a screen in the HMD to compensate for a head tilt of the user wearing the HMD will now be described. It will be apparent to those skilled in the art that the present disclosure may be practiced without some or all of the specific details set forth herein.

Often when a user wears an HMD, the user will tilt their head in one direction or another such as titling their head forward slightly. As a result, images displaying in the HMD may not be properly aligned with the user's central vision. This image misalignment can cause user eyestrain and reduced accuracy in the user's interaction with the virtual environment. For example, the user could be using the HMD to perform intricate task of assembling a complex device in the virtual environment. However, the image misalignment can cause the user to constantly misplace components in the complex device. One approach to adjusting the image displayed on a screen in the HMD to compensate for a head tilt of the user includes determining an offset caused by the user's head tilt and then shifting the displayed image, up, down or to one side or combinations thereof, to compensate for the offset. Correcting the misalignment of the image due to the user's head tilt will result in a more seamless interaction between the user and the virtual environment of the HMD. Correcting the misalignment of the image due to the user's head tilt also allows the user to assume multiple different head tilts during use of the HMD and this allows more comfortable use so that the user is not required to hold his head in one particular orientation or tilt for extended periods of time as that can eventually become uncomfortable and cumbersome.

More details related to head tilt detection and correction will be made with reference to FIGS. 5A-11. Although, it should be understood that all figures should be understood, as embodiments may be combined and assembled in various configurations to define specific implementations.

Figure 1:
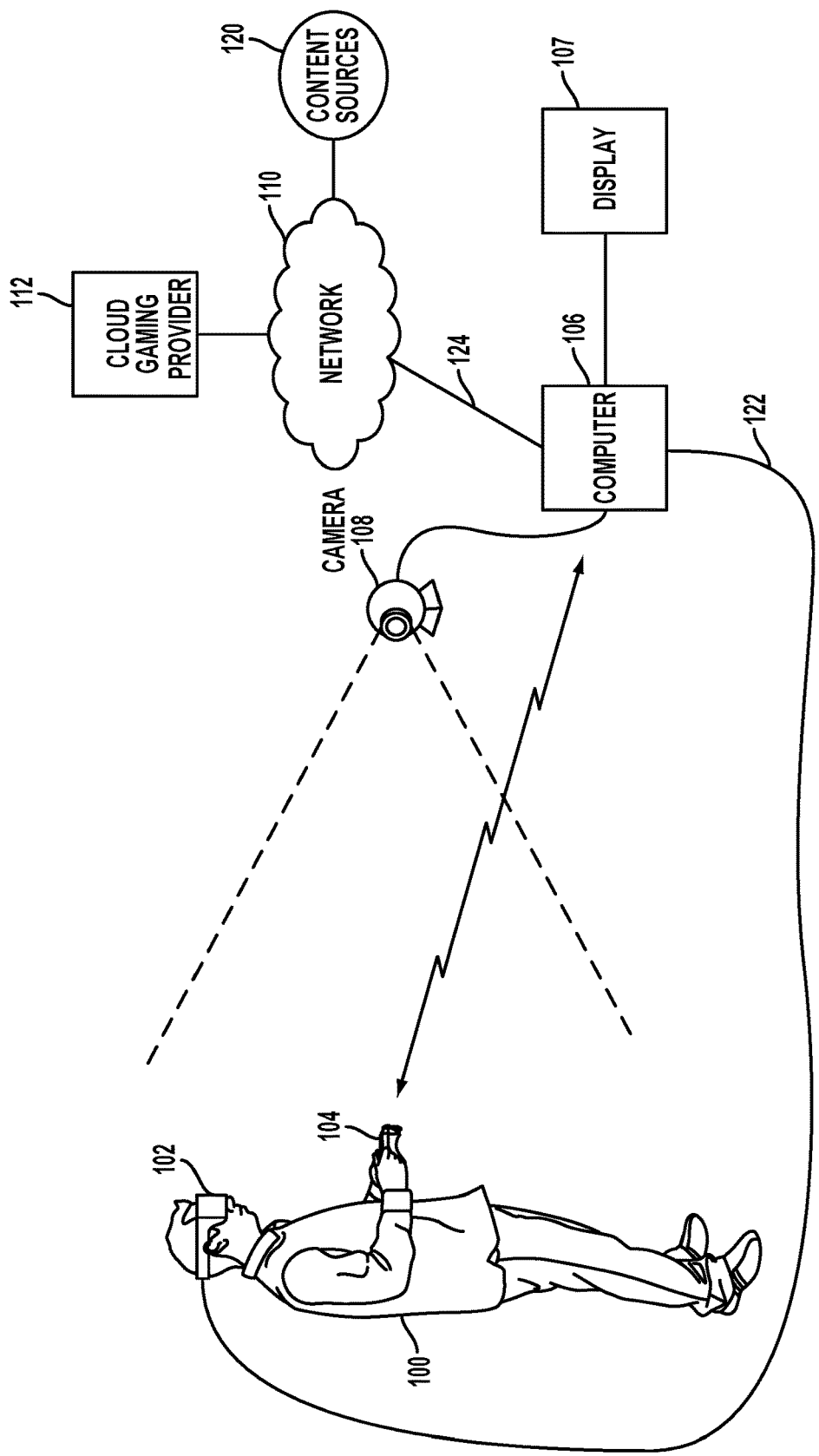
FIG. 1 illustrates a system for interactive gameplay of a video game, in accordance with the disclosed embodiments.

FIG. 1 illustrates a system for interactive gameplay of a video game, in accordance with the disclosed embodiments. A user 100 is shown wearing a head-mounted display (HMD) 102. The HMD 102 is worn in a manner similar to glasses, goggles, or a helmet, and is configured to display a video game or other content to the user 100. The HMD 102 is configured to provide an immersive experience to the user by virtue of its provision of display mechanisms (e.g., optics and display screens) in close proximity to the user's eyes and the format of the content delivered to the HMD. In one example, the HMD 102 may provide display regions to each of the user's eyes which occupy large portions or even the entirety of the field of view of the user. The HMD screen can have a refresh rate of about 30 to about 500 frames per second (Hz). In one implementation, the HMD screen can have a selectable refresh rate of about 60 or about 120 Hz.

In one embodiment, the HMD 102 may be connected to a computer 106. The connection 122 to computer 106 may be wired or wireless. The computer 106 may be any general or special purpose computer, including but not limited to, a gaming console, personal computer, laptop, tablet computer, mobile device, cellular phone, tablet, thin client, set-top box, media streaming device, etc. In some embodiments, the HMD 102 may connect directly to a network 110 such as the internet, which may allow for cloud gaming without the need for a separate local computer. In one embodiment, the computer 106 may be configured to execute a video game (and other digital content), and output the video and audio from the video game for rendering by the HMD 102. The computer 106 is also referred to herein as a client system 106, which in one example is a video game console.

The computer 106 may, in some embodiments, be a local or remote computer, and the computer may run emulation software. In a cloud gaming embodiment, the computer 106 is remote and may be represented by multiple computing services that may be virtualized in data centers, wherein game systems/logic may be virtualized and distributed to user over a network 110.

The user 100 may operate a controller 104 to provide input for the video game. In one example, a camera 108 may be configured to capture image of the interactive environment in which the user 100 is located. These captured images may be analyzed to determine the location and movements of the user 100, the HMD 102, and the controller 104. In one embodiment, the controller 104 includes a light (or lights) which may be tracked to determine its position/location and pose. Additionally, as described in further detail below, the HMD 102 may include one or more lights 200A-K which may be tracked as markers to determine the position and pose of the HMD 102 in substantial real-time during game play.

The camera 108 may include one or more microphones to capture sound from the interactive environment. Sound captured by a microphone array may be processed to identify the location of a sound source. Sound from an identified location may be selectively utilized or processed to the exclusion of other sounds not from the identified location. Furthermore, the camera 108 may be defined to include multiple image capture devices (e.g. stereoscopic pair of cameras), an IR camera, a depth camera, and combinations thereof.

In some embodiments, computer 106 may execute games locally on the processing hardware of the computer 106. The games or content may be obtained in any form, such as physical media form (e.g., digital discs, tapes, cards, thumb drives, solid state chips or cards, etc.) or by way of download from the Internet, via network 110. In another embodiment, the computer 106 functions as a client in communication over a network with a cloud gaming provider 112. The cloud gaming provider 112 may maintain and execute the video game being played by the user 100. The computer 106 transmits inputs from the HMD 102, the controller 104 and the camera 108, to the cloud gaming provider 112, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the controller 104 or other input devices, e.g., gloves, clothes, the HMD 102, or combinations of two or more thereof.

In one embodiment, the HMD 102, controller 104, and camera 108, may themselves be networked devices that connect to the network 110 to communicate with the cloud gaming provider 112. For example, the computer 106 may be a local network device, such as a router, that does not otherwise perform video game processing, but facilitates passage of network traffic. The connections 124 to the network by the HMD 102, controller 104, and camera 108 may be wired or wireless. In some embodiments, content executed on the HMD 102 or displayable on a display 107, may be obtained from any content source 120. Example content sources may include, for instance, internet websites that provide downloadable content and/or streaming content. In some examples, the content may include any type of multimedia content, such as movies, games, static/dynamic content, pictures, social media content, social media websites, etc.

As will be described below in more detail, a user 100 may be playing a game on the HMD 102, where such content is immersive 3D interactive content. The content on the HMD 102, while the player is playing, may be shared to a display 107. In one embodiment, the content shared to the display 107 may allow other users proximate to the user 100 or remote to watch along with the user's play. In still further embodiments, another user viewing the game play of user 100 on the display 107 may participate interactively with player 100. For example, a user viewing the game play on the display 107 may control characters in the game scene, provide feedback, provide social interaction, and/or provide comments (via text, via voice, via actions, via gestures, etc.,) which enables users that are not wearing the HMD 102 to socially interact with user 100, the game play, or content being rendered in the HMD 102.

Figure 2:
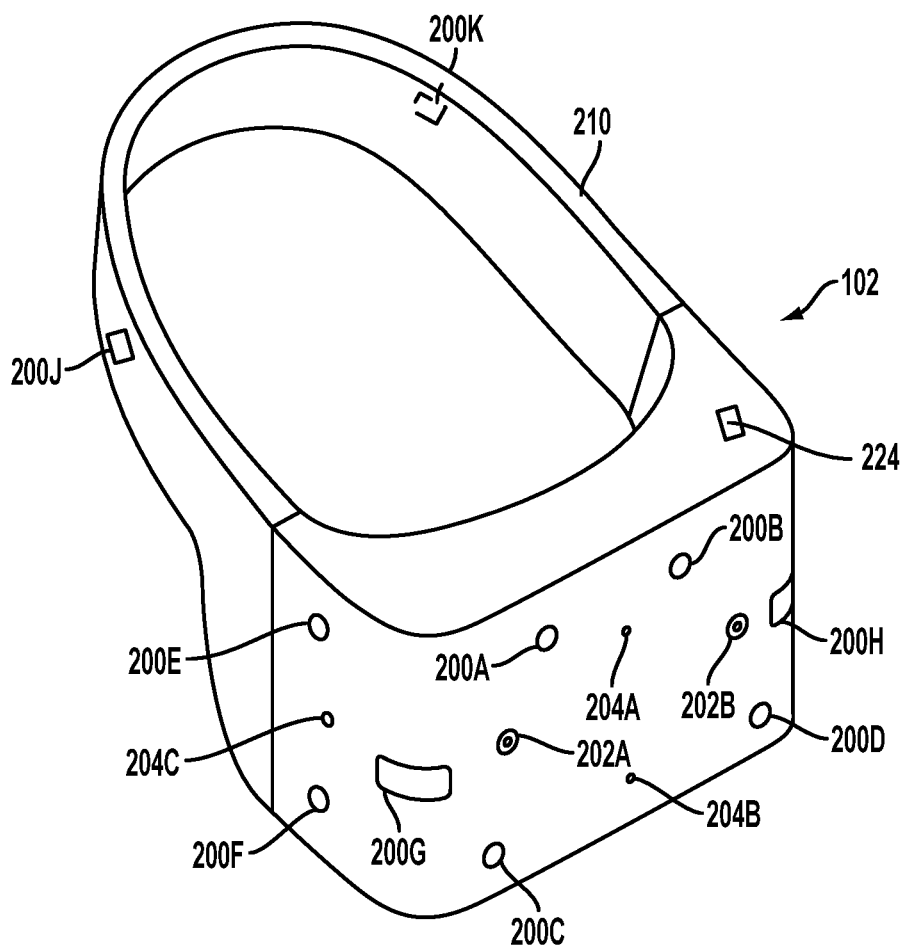
FIG. 2 illustrates a HMD, in accordance with the disclosed embodiments.

FIG. 2 illustrates a HMD 102, in accordance with the disclosed embodiments. As shown, the HMD 102 includes a plurality of lights 200A-K (e.g., where 200K and 200J are located toward the rear or backside of the HMD headband 210). Each of these lights may be configured to have specific shapes and/or positions, and may be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights may be identified in captured images of an interactive environment in which a user uses the HMD 102.

Based on identification and tracking of the lights, the position and pose of the HMD 102 in the interactive environment may be determined. It will further be appreciated that some of the lights 200A-K may or may not be visible depending upon the particular position and pose of the HMD 102 relative to an image capture device. Also, different portions of lights (e.g. lights 200G and 200H) may be exposed for image capture depending upon the position and pose of the HMD 102 relative to the image capture device. In some embodiments, inertial sensors are disposed in the HMD 102, which provide feedback regarding orientation, without the need for lights 200A-K. In some embodiments, the lights and inertial sensors work together, to enable mixing and selection of position/motion data.

In one embodiment, the lights may be configured to indicate a current status of the HMD 102 to others in the vicinity. For example, some or all of the lights 200A-K may be configured to have a certain color arrangement, intensity arrangement, be configured to blink, have certain on/off configuration, or other arrangement indicating a current status of the HMD 102. By way of example, the lights 200A-K may be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights 200A-K might also be configured to indicate relative intensity levels of gameplay. For example, the intensity of lights 200A-K, or a rate of blinking, may increase when the intensity of gameplay increases.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones 204A-C, sound from each of the microphones may be processed to determine the location of the sound's source. This information may be utilized in various ways, including exclusion of unwanted sound sources, association of a sound source with a visual identification, etc.

The HMD 102 may also include one or more image capture devices. In the illustrated embodiment, the HMD 102 is shown to include image captured devices 202A and 202B. By utilizing a stereoscopic pair of image capture devices, three-dimensional (3D) images and video of the environment may be captured from the perspective of the HMD 102. Such video may be presented to the user to provide the user with a "video see-through" ability while wearing the HMD 102. That is, though the user cannot see through the HMD 102 in a strict sense, the video captured by the image capture devices 202A and 202B may nonetheless provide a functional equivalent of being able to see the environment external to the HMD 102 as if looking through the HMD 102.

Such video may be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras or a single camera may be installed on the HMD 102, and oriented in any direction. For example, in another embodiment, there may be cameras mounted on the sides of the HMD 102 to provide additional panoramic image capture of the environment. In one embodiment, front facing camera (RCG, and/or depth cameras) may be used to track position and pose, and motions of hands or gloves of the user. As will be described below, information from the image data captured by the front facing cameras can be used to provide finer resolution and otherwise improved haptic feedback to the user when interfacing with virtual objects.

Figure 3:
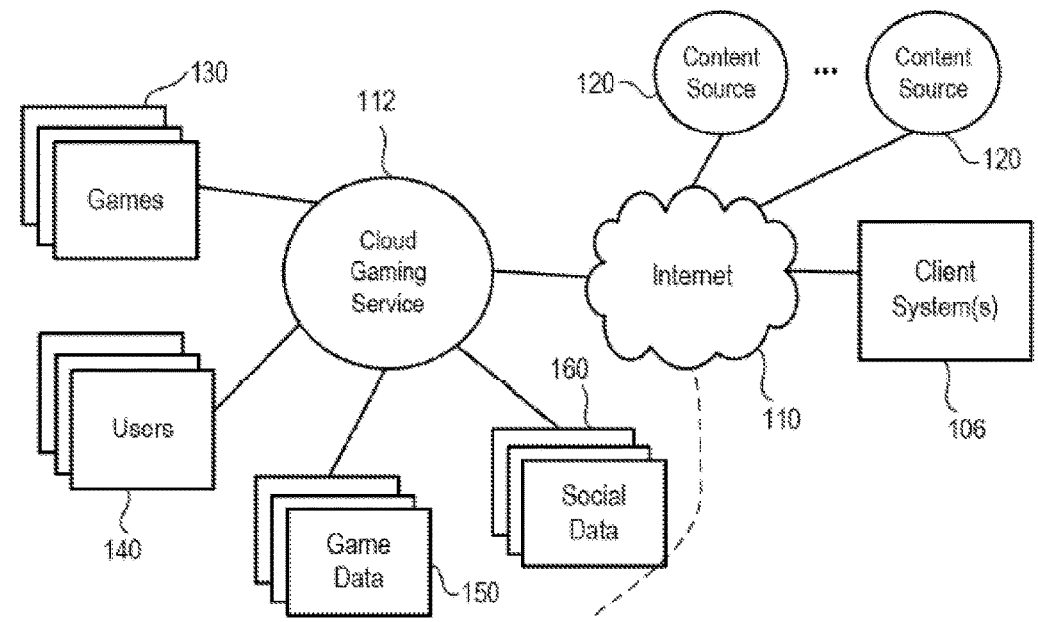
FIG. 3 illustrates one example of gameplay using the client system that is capable of rendering the video game content to the HMD of a user.
Figure 3:
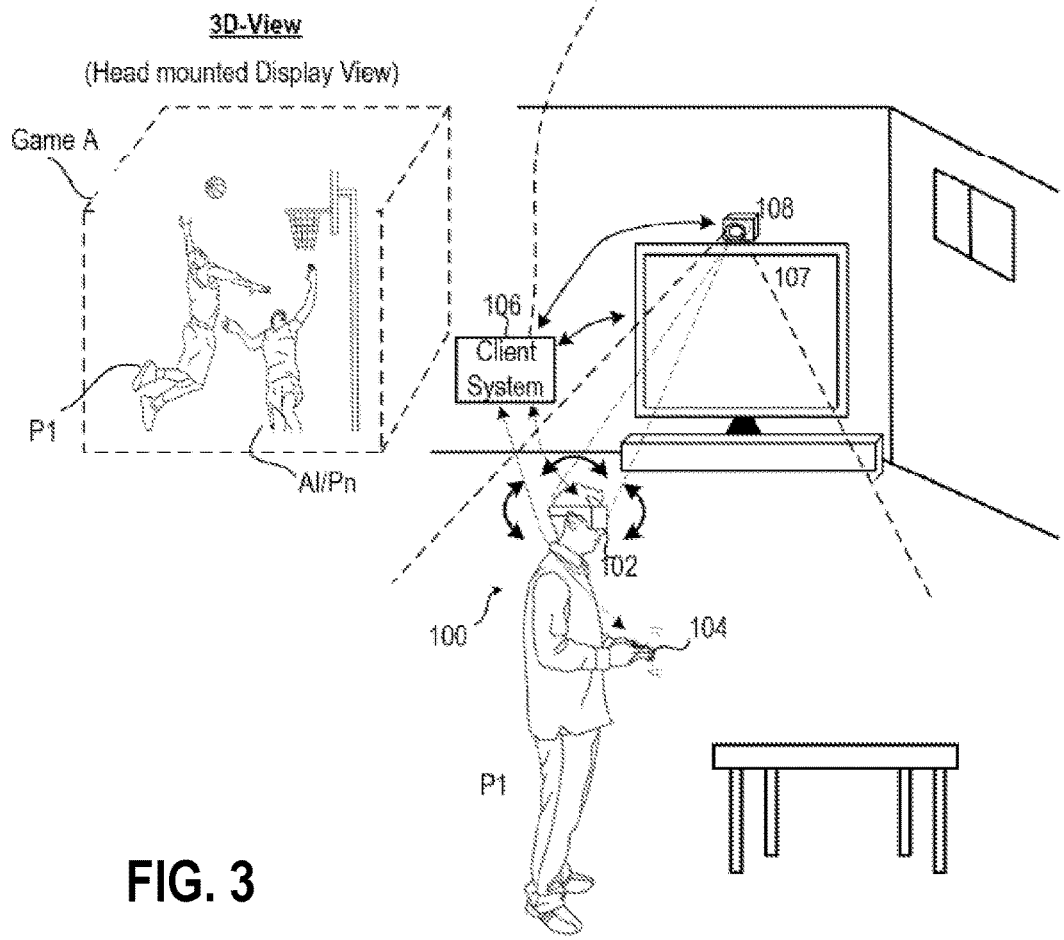

FIG. 3 illustrates one example of gameplay using the client system 106 that is capable of rendering the video game content to the HMD 102 of user 100. The rendering may be of an object or many objects of a scene. The objects can be things viewable in the scene, and the things can be characters, persons, buildings, landscapes, and generally graphically generated content that is typical in VR spaces, video games, interactive content, interactive games, learning games or learning content, travel content, pictures, images, etc. In this illustration, the game content provided to the HMD 102 is in a rich interactive 3-D space. As discussed above, the game content may be downloaded to the client system 106 or may be executed in one embodiment by a cloud processing system. Cloud gaming service 112 may include a database of users 140, which are allowed to access particular games, share experiences with other friends, post comments, and manage their account information.

The cloud gaming service 112 may also store game data 150 for specific users, which may be usable during gameplay, future gameplay, sharing to a social media network, or for storing trophies, awards, status, ranking, etc. Social data 160 may also be managed by cloud gaming service 112. The social data 160 may be managed by a separate social media network, which may be interfaced with cloud gaming service 112 over the Internet 110. Over the Internet 110, any number of client systems 106 may be connected for access to the content and interaction with other users.

Continuing with the example of FIG. 3, the three-dimensional interactive scene viewed in the HMD 102 may include gameplay, such as the characters illustrated in the 3-D view. One character, e.g. P1, may be controlled by the user 100 that is wearing the HMD 102. This example shows a basketball scene between two players, wherein the HMD user 100 is dunking a ball on another character in the 3-D views. The other character may be an AI (artificial intelligence) character of the game, or may be controlled by another user or users (Pn). User 100, who is wearing the HMD 102, is shown moving about in a space of use, wherein the HMD may move around based on the user's head movements and body positions. The camera 108 is shown positioned over a display screen in the room, however, for HMD 102 use, the camera 108 may be placed in any location that may capture images of the HMD 102. As such, the user 100 is shown turned at about 90 degrees from the camera 108 and the display 107, as content rendered in the HMD 102 may be dependent on the direction that the HMD 102 is positioned, from the perspective of the camera 108. Of course, during HMD 102 use, the user 100 will be moving about, turning his head, looking in various directions, as may be needed to take advantage of the dynamic virtual scenes rendered by the HMD.

Figure 4:
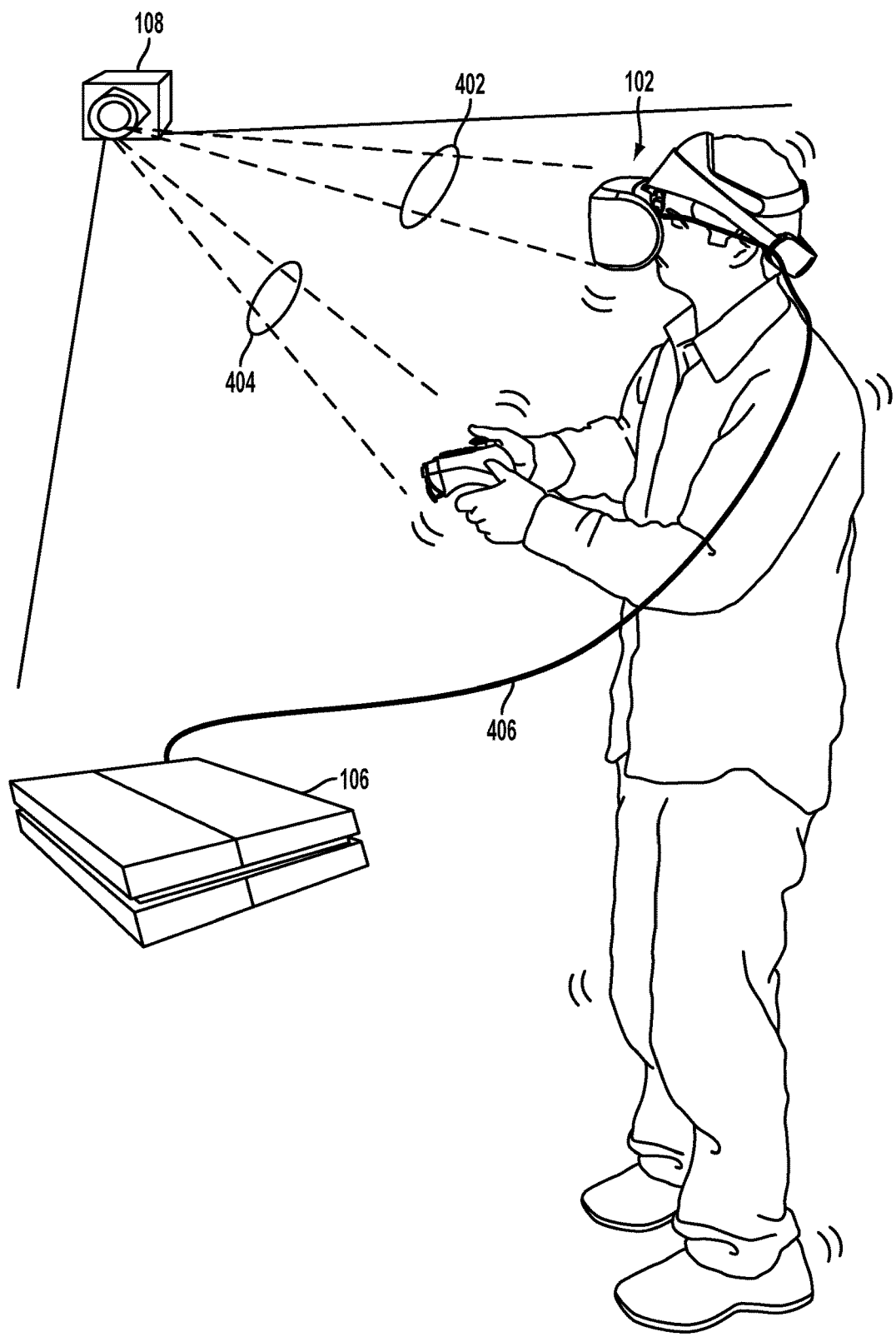
FIG. 4 illustrates a user wearing the HMD, during use, in accordance with the disclosed embodiments.

FIG. 4 illustrates a user wearing the HMD 102, during use, in accordance with the disclosed embodiments. In this example, it is shown that the HMD 102 is tracked 402 using an outside in tracking process where the camera 108 is tracking the HMD 102 location. The camera 108 is tracking the HMD 102 location using image data obtained from captured video frames by the camera 108. In other embodiments, tracking can also or alternatively utilize inertial data from the HMD itself. In various embodiments, tracking the user's head/HMD can include blended data obtained from image tracking and inertial tracking. Additionally, it is shown that the controller may also be tracked 404 using image data obtained from captured video frames by the camera 108. Also shown is the configuration where the HMD 102 is connected to the computing system 106 via a cable 406. In one embodiment, the HMD 102 obtains power from the same cable or may connect to another cable. In still another embodiment, the HMD 102 may have a battery that is rechargeable, so as to avoid extra power cords. In still other embodiments, the user's hands can be tracked, with or without gloves.

In some embodiments, HMD experiences have an explicit or implied reticle in the center of the screen that is used to select objects or activate events. Some HMD users, notably those wearing bifocals, have trouble with those experiences because often the focal seam in their glasses line up with the position of the reticle. In one embodiment, once an offset is identified for the specific user, this offset can be stored in the user's settings (e.g., profile). Other data that can be stored in user settings may include a user's IPD (interpupillary distance). As an advantage, identifying an offset or parameters of an offset due to head tilt will ensure that many or all HMD experiences that use central reticles get a consistently good experience. Various methods can be used to adjust the target reticle configuration. Some examples may include selecting "high reticle", "center reticle" or "low reticle". For instance, it is possible to categorize or certain users as those that view the center of the screen via a head tilt that results in a high or low reticle, as opposed to center reticle. If the user is a center reticle user, then no adjustment would be made. For high or low, the adjustment or offset can be predefined to a specific number, even if the number is not exact to the user. In other configurations, the exact or approximately exact offset can be measured. In still other embodiments, offset can be preset for users that enter selections, e.g., like "wear bifocals" or "don't wear bifocals". In still further embodiments, a slider or joystick may be used to reposition the reticle to a comfortable spot. Further, other embodiments may be providing a selection object, for instance. The selection object can be any graphical or visible thing that can be displayed. Just for example, if a selection object is used during a calibration step, the selection object may be a red square in the middle of the screen. Then, the user is asked to move their head until the red square is in the comfortable reticle position.

As can be appreciated, there are a number of other application specific settings that are valuable, though not generic enough to be user settings. For instance, if the center of a user's gaze is used to activate an event, users may want to configure the radius/sensitivity of the target region. With these broad embodiments in mind, the following examples will illustrate ways to identify head tilt and ways to correct or adjust content to compensate for a specific user's head tilt to improve the user's HMD experience.

FIG. 5A illustrates the HMD 102, during use, in accordance with the disclosed embodiments. The HMD 102 includes a screen 102A for displaying the virtual images to the user. The screen 102A is shown separate from the HMD 102 for purposes of discussion. Often, a central focal point such as a reticle 502 is part of the image displayed on the screen 102A such as may be required for a shooter game or any other type of function where the user needs a gaming device or image. Other central focal points could be the central point 523 of an image being displayed on the screen 102A.

The HMD 102 includes a vertical Y' axis and a horizontal Z' axis. It should be understood also that the HMD 102 also includes an X' axis that passes perpendicular to the page surface through the intersection of the vertical Y' vector and the horizontal Z' vector. The HMD 102 uses the vertical Y' axis, horizontal Z' axis and X' axis to render the perspective of the virtual world images displayed on the screen 102A as the user moves the HMD around relative to the virtual world. The HMD 102 can include inertial sensors that can track the motion of the HMD thus providing movement and orientation information needed to render the perspective of the virtual world images displayed on the screen 102A as the user moves the HMD around relative to the virtual world.

The camera 108 can include a focal plane 108A that can be aligned with or parallel to the vertical Y axis. The camera 108 can also or alternatively track the movement and orientation of the HMD 102 thus providing movement and orientation information needed to render the perspective of the virtual world images displayed on the screen 102A as the user moves the HMD around relative to the virtual world.

Ideally, the vertical Y' vector and the horizontal Z' vector of the HMD 102 are aligned with or parallel to an actual vertical Y axis which is perpendicular to an actual horizontal Z axis in the real world so that the virtual environment displayed on the screen 102A is aligned with the real world in which the user exists and moves. However, the real world is not an ideal world and each human user has an individual shape, size and physical posture.

FIGS. 5B-5D illustrate different human physical postures 510A-510C, in accordance with the disclosed embodiments. As shown in FIG. 5B, an ideal human physical posture 510A has the head substantially aligned with the vertical Y axis of the real world with the central vision of eyes along vector Z' 522 that is substantially parallel to the real world Z axis. Unfortunately, all users do not have an ideal human physical posture 510A.

As shown in FIG. 5B, a common physical posture 510B includes a slightly stooped or bent forward neck and/or shoulders resulting in the head substantially misaligned with the vertical Y axis of the real world as the head is bent down and forward. As a result, the user's face is angled downward. Due to the downward tilt of the user's face, the user tends to compensate by angling the user's central vision upward so as to align the central vision of the user's eyes along vector Z' 522.

As shown in FIG. 5C, a common physical posture 510C includes a slightly upraised face resulting in the head substantially misaligned with the vertical Y axis of the real world as the head is bent upward. As a result, the user's face is angled upward. Due to the upward tilt of the user's face, the user tends to compensate by angling the user's central vision downward so as to align the central vision of the user's eyes along vector Z' 522.

Figure 6A:
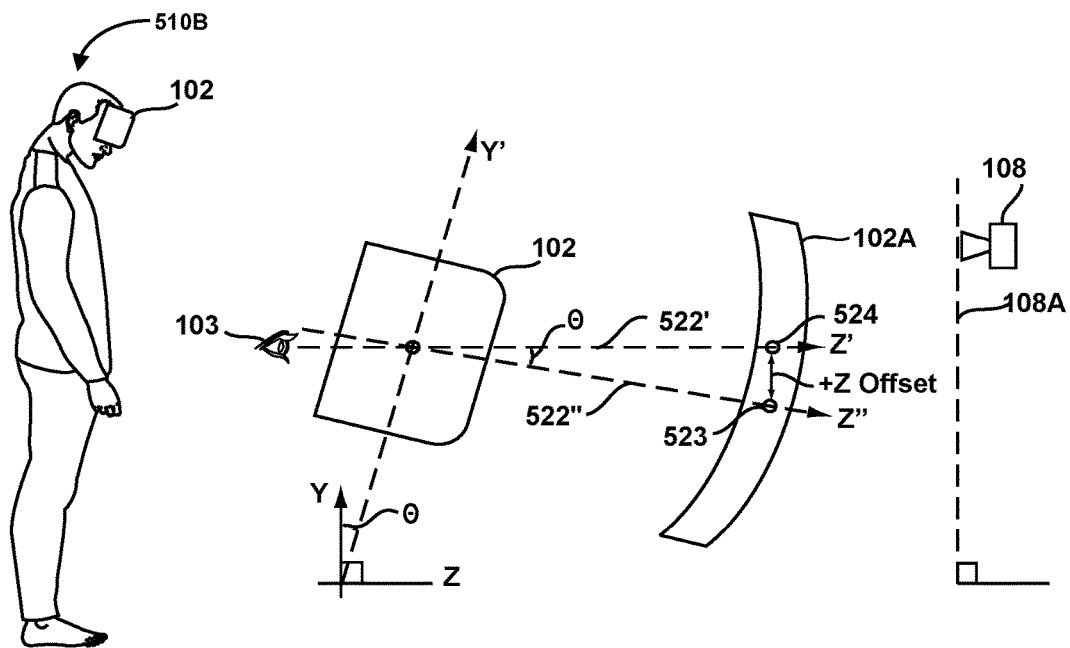
FIGS. 6A and 6B illustrate different human physical postures wearing an HMD, in accordance with the disclosed embodiments.
Figure 6B:
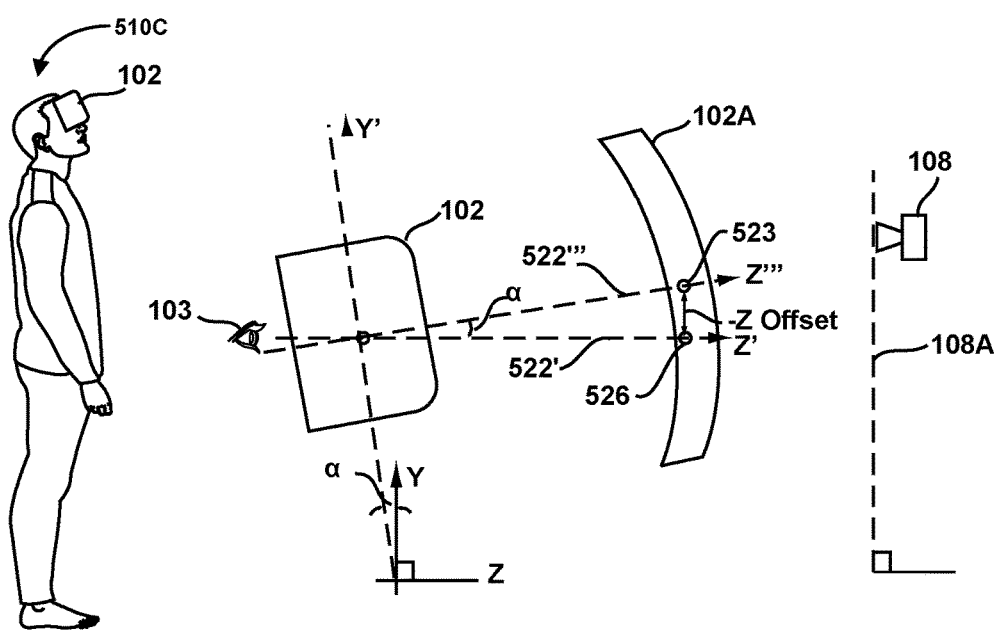

FIGS. 6A and 6B illustrate different human physical postures 510B and 510C wearing an HMD 102, in accordance with the disclosed embodiments. As shown in FIG. 6A, the slightly stooped or bent forward neck and/or shoulders posture 510B. The slightly stooped or bent forward neck and/or shoulders posture 510B can be a user's initial posture where they initially wear the HMD 102. The initial orientation can include a physical reference to the real world such as gravity, or a direction or a relative reference to something in the real-world environment around the HMD 102 such as the camera 108 or a floor or a wall within the room where the user is wearing the HMD.

Before the he user is directed or prompted to observe an object displayed in the screen 102A, the user may be prompted to move to a comfortable viewing posture or position. The comfortable viewing position is when the user viewing toward a direction that is in front of the user, while wearing the HMD 102. However, the user is not prompted to view any specific object or location. The goal is to capture the user's normal, relaxed posture.

When the user is directed or prompted to observe an object displayed in the screen 102A, the user will compensate for their posture by looking upward results in the user's central vision to fall along the vector Z' 522' which is approximately aligned with the real world Z axis. However, due to the user's forward head tilt, the HMD Z axis is shifted downward an angle θ below the real world Z axis and the user's central vision along the vector Z' 522'. As a result, the user's vision falls on a location 524 in the displayed image which is offset a distance +Z" above the central point 523 of the image being displayed on the screen 102A. While compensating for their bent forward neck and/or shoulders posture, the user may move the HMD 102 to a directed orientation that is different than the initial orientation. The offset between the initial orientation and the direct orientation can also be determined by the camera 108 and/or the inertial sensors within the HMD 102.

As shown in FIG. 6B, the slightly upraised face posture 510C initial orientation and the user's compensation of looking downward results in the user's central vision to fall along the vector Z' 522' which is approximately aligned with the real world Z axis. However, due to the user's upward head tilt, the HMD Z axis is shifted downward an angle α above the real world Z axis and the user's central vision along the vector Z' 522'. As a result, the user's vision falls on a location 526 in the displayed image which is offset a distance −Z" below the central point 523 of the image being displayed on the screen 102A.

The user can experience discomfort and eye strain when the user's central vision falls on a location offset from the central point 523 of the image being displayed on the screen 102A. Further, the offset can also result in the HMD 102 rendering a reticle in a position offset from the user's central vision and thus can make the aiming functions to be less accurate.

Figure 7A:
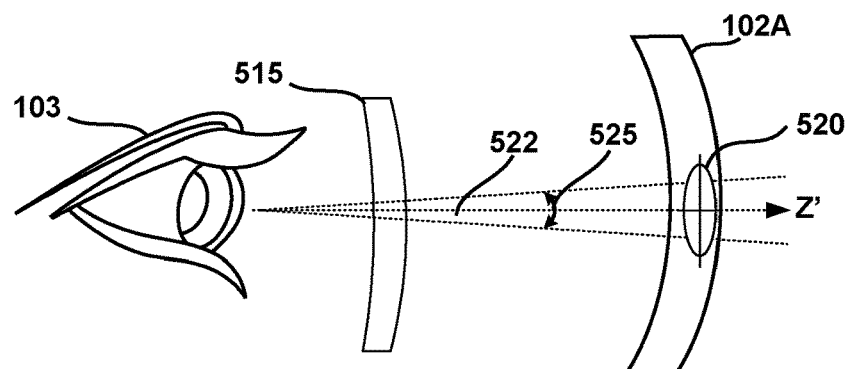
FIGS. 7A-7D illustrate a corrective lens inserted between the user's eye and the reticle in an image being displayed on the screen of the HMD, in accordance with the disclosed embodiments.

FIGS. 7A-7D illustrate a corrective lens 515, 515' inserted between the user's eye 103 and the reticle 520 in an image being displayed on the screen 102A of the HMD 102, in accordance with the disclosed embodiments. As shown in FIG. 7A, typical human eye has a central vision range 525 of about 3-5 degrees. When the image displayed on the screen 102A of the HMD is offset from the user's the central vision range 525, the image can be out of focus or otherwise unclear to the user. The image displayed on the screen 102A can also have reduced amounts of resolution in portions of the displayed image that are outside of or otherwise offset from the central point 523 of the image as an approach to reducing the data content in the displayed image. When the central point 523 of the image is not being aligned with the user's the central vision range 525, the user can experience eye strain and have a less than optimum view of the displayed image.

Also shown in FIG. 7A is a corrective lens 515 interposed between the user's eye 103 and the image including the reticle 520 displayed on the screen 102A. The corrective lens 515 can be included in eyeglasses worn in front of the user's eye or as a contact lens that is in contact with the surface of the user's eye or even an implanted corrective lens that is implanted within the user's eye. The corrective lens 515 is a single vision corrective lens as it has a single optical correction such that the same vision corrective function is provided regardless of the angle the user looks through the lens. A user wearing a single vision corrective lens typically does not tip their head up or down to look at images near or far or intermediate distances away.

Figure 7B:
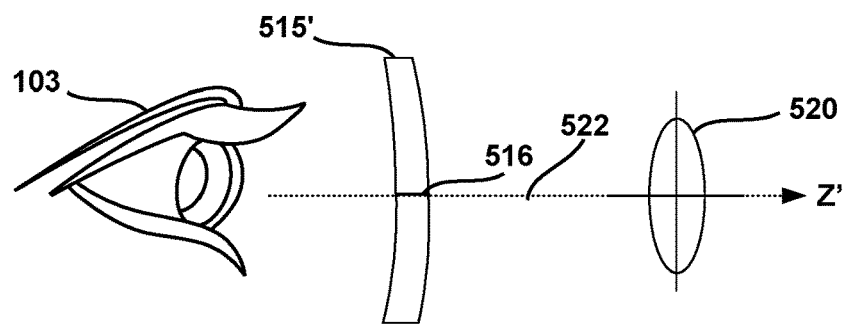

As shown in FIG. 7B, a multi-focal corrective lens 515' is interposed between the user's eye 103 and the image including the reticle 520 displayed on the screen 102A. The multi-focal corrective lens 515' has a first vision correction in an upper half of the lens and a second vision correction in a lower half of the lens. The multi-focal corrective lens 515' can be included in eyeglasses worn in front of the user's eye or as a contact lens that is in contact with the surface of the user's eye or even an implanted corrective lens that is implanted within the user's eye. The multi-focal corrective lens 515' can be a bi-focal corrective lens with two vision correction portions to the lens, as shown. Alternatively, the multi-focal corrective lens 515' can be a tri-focal with three vision correction portions to the lens. The multi-focal corrective lens 515' can include more than three vision correction portions to the lens.

The multi-focal corrective lens 515' can be a progressive type lens where each of the vision correction portions of the lens are blended together without a visible dividing line separating each of the vision correction portions. Often the multi-focal corrective lens 515' includes a visible dividing line 516 between the first vision correction in the upper portion of the lens and the second vision correction in the lower portion of the lens. The dividing line 516 is often aligned with the central vision of the user's eye 103 along vector Z' 522 that is also substantially aligned with the reticle 520 of the displayed image. The dividing line 516 thus obscures the reticle 520.

Figure 7C:
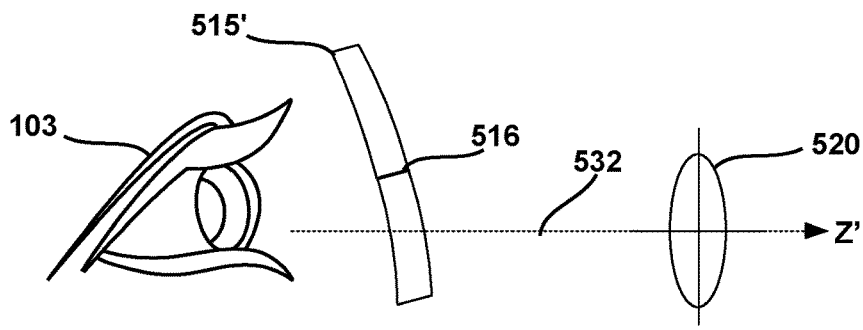
Figure 7D:
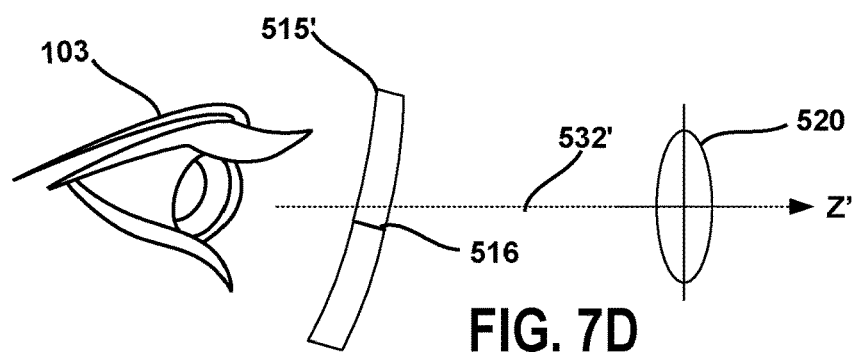

Users wearing multi-focal lenses, whether with a visible dividing line or progressive type multi-focal corrective lenses with no visible dividing line will often tilt their head slightly back, as shown in FIG. 7C, so as to adjust their central vision 532 to be above the dividing line 516 or to direct their central vision through a selected portion of the corrective lens for looking at something off in the distance. Users wearing multi-focal lenses will often tilt their head slightly forward, as shown in FIG. 7D, so as to adjust their central vision 532' to be below the dividing line 516 or to direct their central vision through a selected portion of the corrective lens for looking at something closer. As a result, often a user wearing multi-focal corrective lenses may inadvertently tilt their head forward or back when using the HMD 102. The user's inadvertent tilting of their head forward or back can result in the same offset issues described above in FIGS. 6A and 6B above. However, the HMD can compensate for the user's head tilt to maintain the reticle 520 aligned with the user's central vision 532, 532'.

Figure 7E:
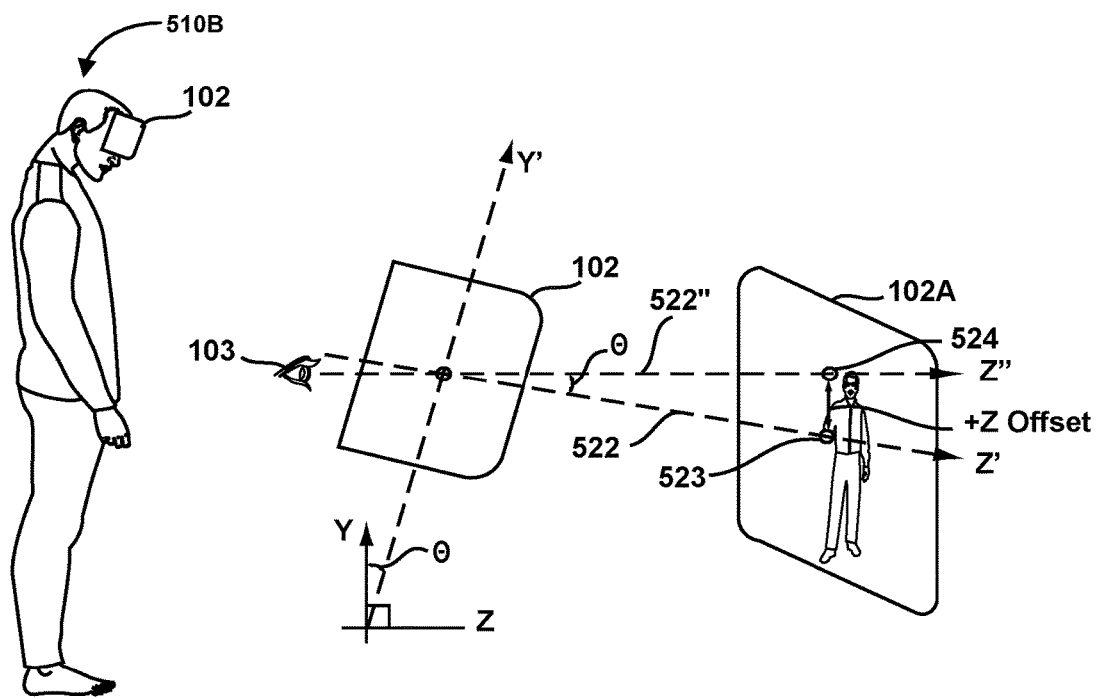
FIGS. 7E and 7F illustrate a user's head tilt while viewing an image displayed on the screen of the HMD, in accordance with the disclosed embodiments.
Figure 7F:
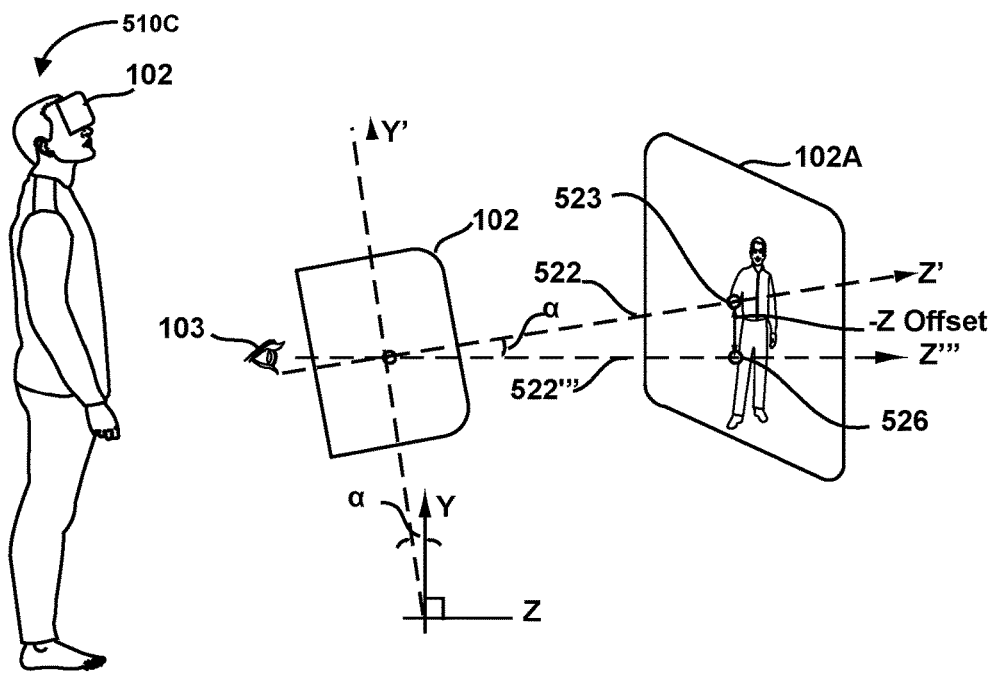

FIGS. 7E and 7F illustrate a user's head tilt while viewing an image displayed on the screen 102A of the HMD 102, in accordance with the disclosed embodiments. The displayed image can include a baseball player holding a baseball. The user can be directed to observe, and therefore direct the user's central vision toward, the baseball player or the baseball in the player's hand. The baseball player can be standing still or moving or the baseball player can be just holding the baseball or throwing the baseball. As the user directs their central vision toward the baseball or the baseball player the HMD 102 can be tracking the user's eyes.

In one implementation, the HMD can directly track the user's eye movement with one or more cameras or detectors directed toward the user's eyes. The HMD can provide the user's detected eye motion to the game console or server for processing to determine if the user is accurately tracking the player or the baseball, or some other interactive object in the displayed image. In another implementation, the HMD can indirectly track the user's eye movement by measuring how accurately the user can identify the movement of the baseball. By way of example, the user can be requested to swing a virtual baseball bat at the baseball as the baseball approaches the user in the interactive scene displayed in the screen. When the user repeatedly estimates the path of the baseball is too high or too low and thus misses hitting the baseball with the user's virtual baseball bat, then the amount the user is missing the baseball can be interpreted as +Z or a −Z offset.

The foregoing examples illustrate the user's head tilt forward and to direct their face in a somewhat downward direction or backward and to direct their face in a somewhat upward direction. However, it should be understood that the user could tilt their head sideways to one side or the other such as tilting their head toward their right side or toward their left side. The user can tilt their head to one side in addition to or instead of tilting their head forward and down or backward and up. The HMD can detect the user's sideways head tilt in a similar fashion to detecting the user's forward and backward head tilt. Similarly, the HMD 102 can adjust the displayed image to compensate for the user's sideways head tilt in the same manner as adjusting the displayed image for the user's forward or backward head tilt.

Figure 8:
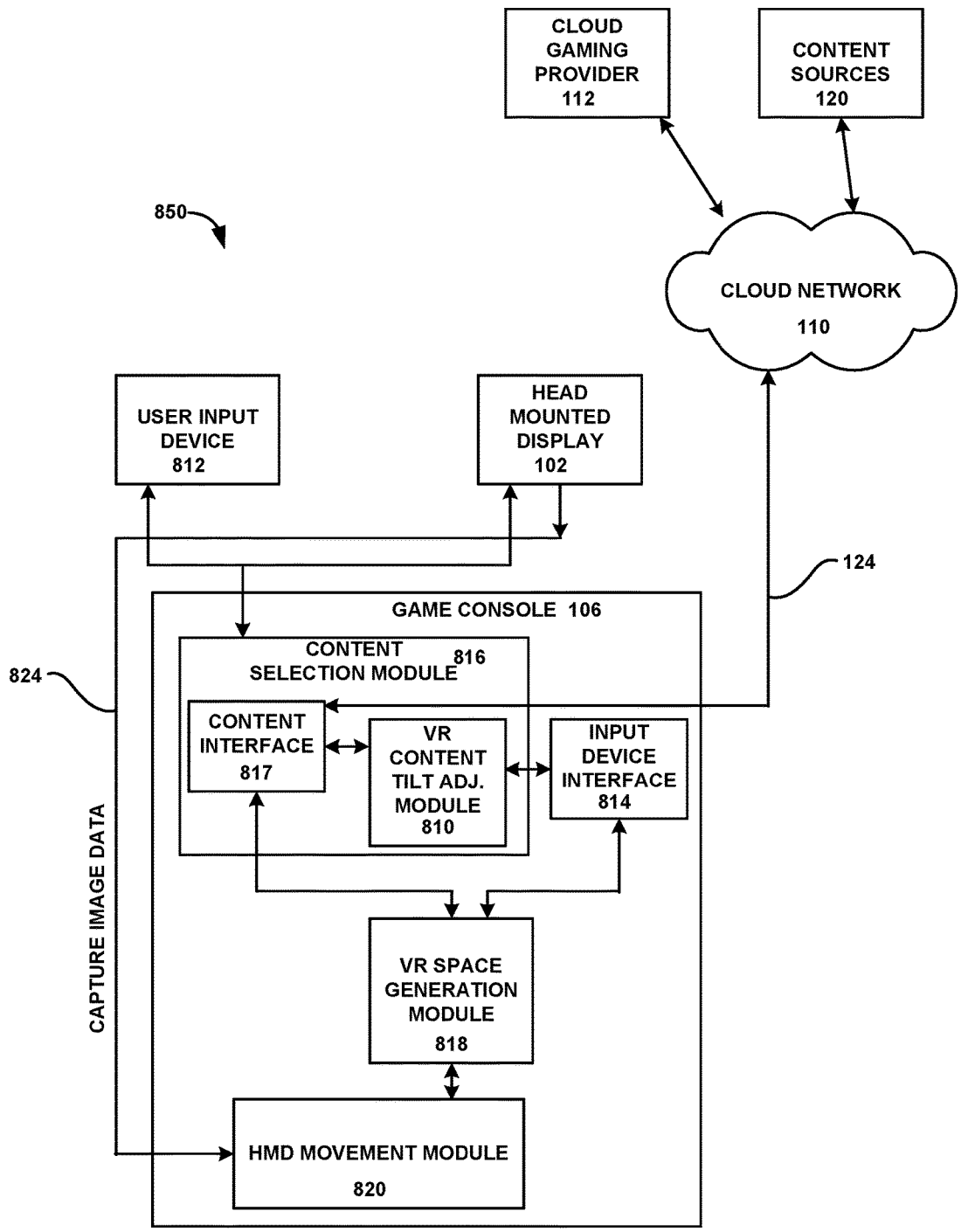
FIG. 8 is a simplified schematic of a system for head tilt adjusting the rendered images to be displayed in the HMD, in accordance with the disclosed embodiments.

FIG. 8 is a simplified schematic of a system 850 for head tilt adjusting the rendered images to be displayed in the HMD 102, in accordance with the disclosed embodiments. The system 850 includes a game console 106 coupled to a cloud network 110 and a cloud gaming provider 112 and content sources 120. The game console 106 is also coupled to the head mounted display 102, other peripheral devices such as user input device 812. (e.g., gloves, controller, motion controllers, inertial sensors, light controllers, magnetic controllers, etc.)

The game console 106 includes a content selection module 816, an input device interface 814, a VR space generation module 818 and HMD movement module 820. The content selection module 816 includes a content interface 817 and a virtual reality content selection module 810.

In operation the content interface 817 receives virtual reality content from various content sources 120. The content tilt adjustment module 810 adjusts the appropriate portions of the virtual reality content from the content interface 817 corresponding to the detected offset caused by the user's head tilt according to inputs received from various input devices through the input device interface 814 and the HMD movement module 820. As an example, when the user's head tilt is upward, as shown in FIG. 6B above, the content tilt adjustment module 810 receives an input from one or more sensors on the HMD 102 and/or from a camera 108 external from and directed toward the HMD that detects the tilt of the HMD and adjusts the displayed content on the screen 102A in the HMD to compensate for the user's head tilt so as to re-center the displayed content on the user's central vision. The content interface 817 outputs the adjusted VR content to the VR space generation module 818. The VR space generation module 818 generates the virtual environment or space presented in the HMD 102.

Figure 9:
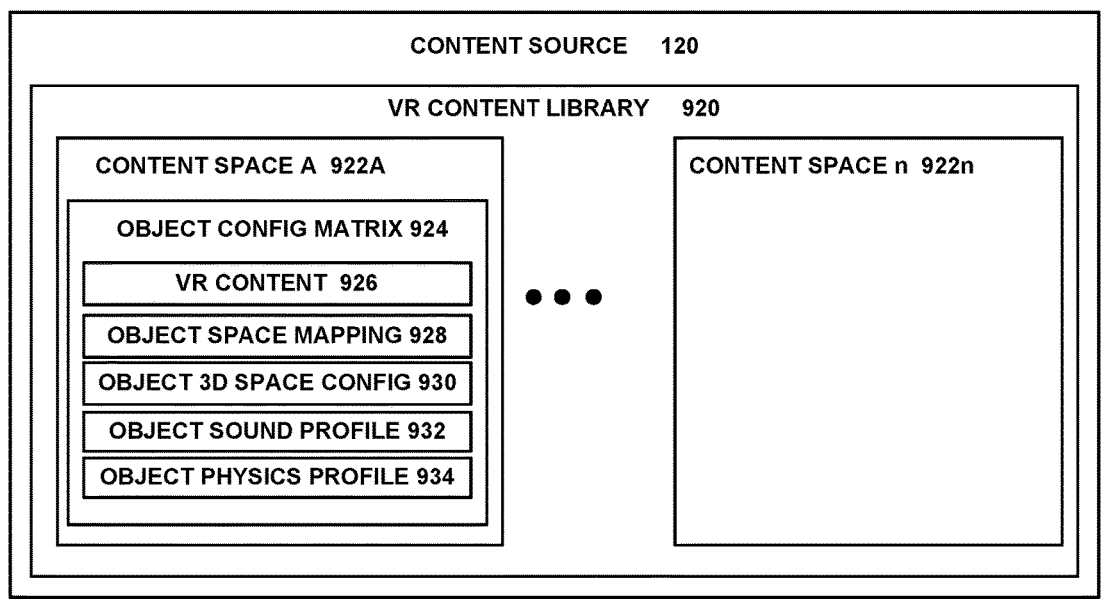
FIG. 9 is a simplified schematic of the content source, in accordance with the disclosed embodiments.

FIG. 9 is a simplified schematic of the content source 120, in accordance with the disclosed embodiments. The content source 120 includes several modules including a VR content library 920. Multiple content spaces 922A-n are included within the VR content library 920. VR content 926 provides the data needed by the VR content selection module 810 to define the virtual space displayed on the HMD 102.

The object 3D space configuration module 930 provides the 3D features of the displayed objects. These 3D features can include weight, shapes, textures and colors of the displayed object.

The object sound profile 932 provides sounds corresponding to the displayed virtual objects and the virtual space. For example, the sound of wind rustling the leaves of the trees, distant thunder, and animal sounds present in the virtual space displayed on the HMD. The object physics profile 934 provides the physical motion and texture characteristics of the various objects displayed in the virtual space. Each of the motion, texture, sound, position and pose, and location of the objects is played within the virtual space are used by the VR content selection module 810 and the VR space generation module to generate the objects in the VR space displayed on the HMD 102.

Figure 10:
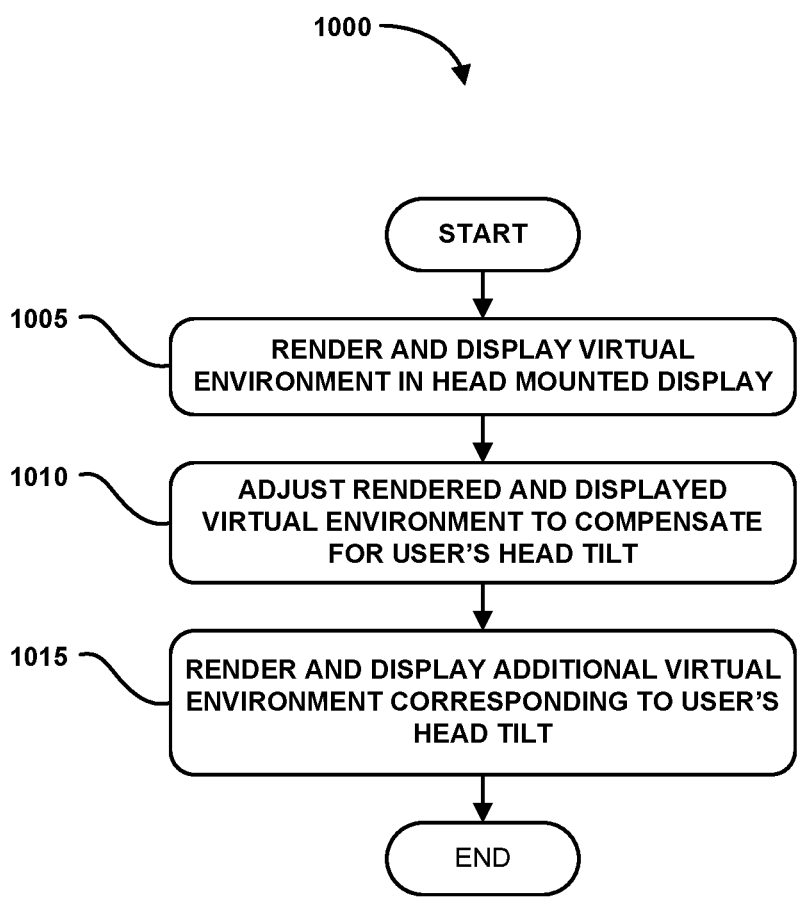
FIG. 10 is a flowchart diagram that illustrates the method operations performed in adjusting an image displayed in the HMD, in accordance with the disclosed embodiments.

FIG. 10 is a flowchart diagram that illustrates the method operations 1000 performed in adjusting an image displayed in the HMD 102, in accordance with the disclosed embodiments. In an operation 1005, the virtual space is rendered and displayed to the user through the HMD 102. The various virtual objects present in the virtual space are also displayed to the user. In an operation 1010, the virtual space is adjusted to compensate for the user's head tilt. As an example, the user can tilt the HMD 102 upward, downward, or to the left or to the right and combinations thereof.

In an operation 1015, the game console 106 provides the additional virtual environment that is adjusted corresponding with the user's head tilt. This provides the user with a smooth scanning sensation with the displayed virtual images centered on the user's central vision rather than the central portion of the screen 102A of the HMD 102.

Figure 11:
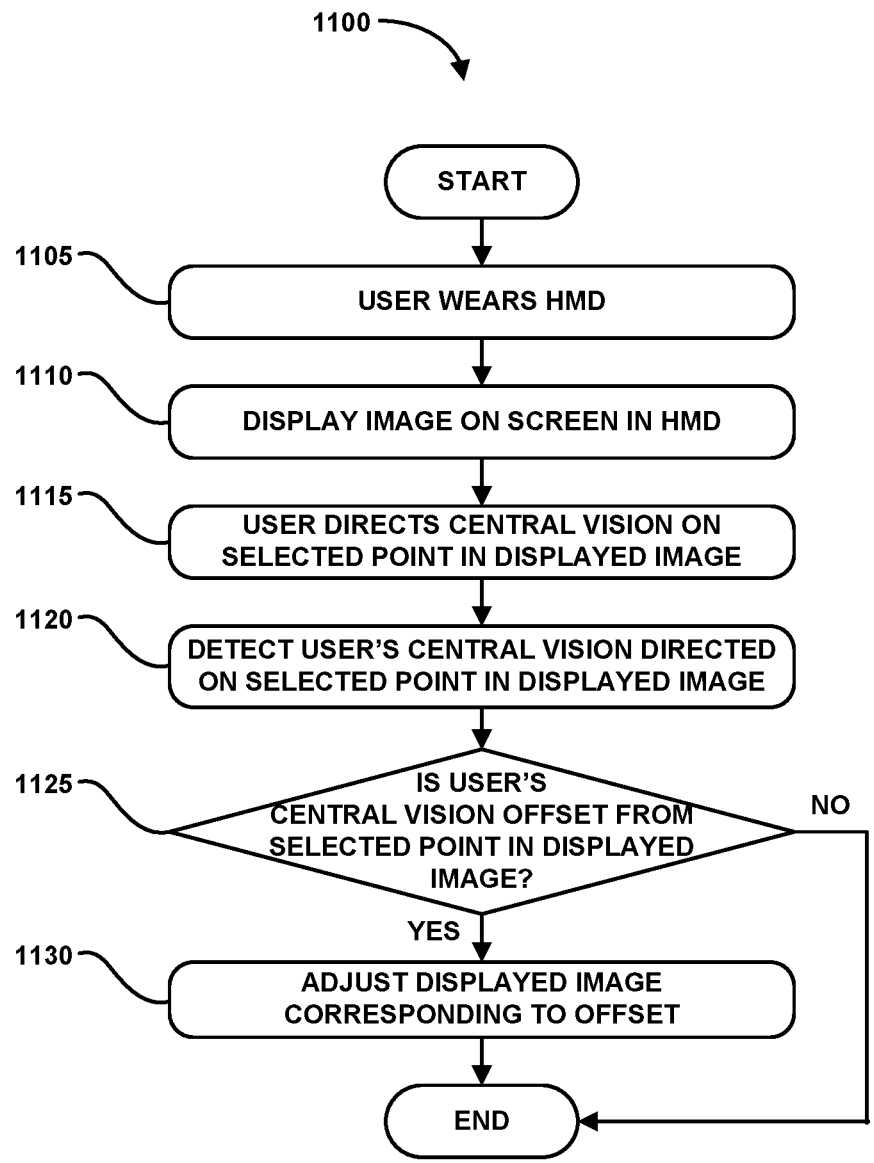
FIG. 11 is a more detailed flowchart diagram that illustrates the method operations performed in tracking movement of the HMD, in accordance with the disclosed embodiments.

FIG. 11 is a more detailed flowchart diagram that illustrates the method operations 1100 performed in tracking movement of the HMD 102, in accordance with the disclosed embodiments. In an operation 1105, a user wears the HMD 102. The HMD 102 is worn in a comfortable, position seated on the user's face and positioned over the user's eyes. In an operation 1110, an image of a virtual space is displayed to the user on the screen 102A of the HMD 102.

In an operation 1115, the user is prompted to observe a specific location or object in the virtual space images displayed on the screen 102A. When the user is prompted to observe on the selected object or location they will tend to relax and place their head in whatever had tilt forward, backward, side to side that is comfortable to them, e.g., comfort position or posture, and direct their central vision toward the selected object.

In an operation 1120, the location in the displayed image that the user's central vision is directed toward is detected. Detecting the location in the displayed image that the user's central vision is directed toward can be determined by measuring a user's performance. For example, the user make be directed in operation 1115 to follow a moving object and attempt to hit the object when it is in a specific location in the displayed image. However, due to the user's head tilt, the user's central vision will be somewhat offset from the ideal location of the moving object and the amount of the offset can be determined. The process of directing the user to focus their attention to a specific location or object and detecting the location in the displayed image that the user's central vision is directed toward can be performed numerous times to refine the detected offset such as the +Z and −Z offset described in FIGS. 6A and 6B above.

In another example, the user can be specifically asked to look at one or more moving or fixed locations or objects in the displayed image and then acknowledge whether the image is clearly in focus or not clearly in focus to the user. The user can provide an input (e.g., press a button, or a verbal indication or other input) to the HMD 102 and/or game controller to indicate the object is in focus or not in focus.

In another example, the user can be instructed to look at a reticle 520, as shown in FIGS. 7A-7D. In another example, the user can be directed to observe or look at a particular object displayed in the virtual space such as a fixed or a moving object. Directing the user to focus on a particular object can be part of a calibration process where the user is specifically prompted to direct their attention to the selected object. Alternatively, the calibration process can be a portion of the game or other virtual space activity the user is experiencing with the HMD 102 and the user's attention is directed toward some action within the displayed images of the virtual space displayed on the screen 102A of the HMD. The VR content tilt adjust module 810 can provide a guide and/or feedback to prompt the user when to be in an initial orientation or when to stop moving. In one implementation, the VR content tilt adjust module 810 can also prompt the user when the calibration is complete, so that the system can capture the coordinates of both initial orientation and directed orientation. By way of example, the prompts can include displaying a visual cue on the screen such as OK or GOOD or an audible cue such as a tone or a verbal instruction or the user can be prompted to provide an input such as a verbal response or a button input to the game controller to indicate that the scene displayed in the screen 102A is improved.

In another implementation, the directed orientation can be captured after a selected period of time or a threshold period of time. For example, a selected period of time can be between about 0.5 second and about 2 seconds. Alternatively, the selected period of time can be relative to the interactive content presented on the screen 102A and the time is determined when the user completes a portion of the interaction with the content, e.g., completed a portion of play of a game. In another implementation, the selected period of time can be after the selected object is rendered. The threshold period of time can also be after an expected period of time required for the user to move from the initial orientation to view the location of the object.

In an operation 1125, if the offset detected in operation 1120 does not exceed a preselected amount, then the method operations can end as no adjustment to the images displayed on the screen are needed. It should be understood though that the image adjusting process can be ongoing and therefore, even if the present iteration did not find a measurable offset due to the user's head tilt, there may be additional head tilt at some later time during the user's use of the HMD. By way of example, if the user is initially standing during use of the HMD, the user may have one posture where there is significant head tilt forward and down that the HMD can then adjust the image to compensate for the offset caused by the user's head tilt. Later, during the same use of the HMD, the user may sit down in a chair or lay down on a bed, and as a result, the user's head tilt may change and the image may require a different adjustment to compensate for the user's changed head tilt.

If the offset detected in operation 1120 exceeds the preselected amount, then the method operations can continue in an operation 1130 where the image displayed in the screen 102A can be adjusted to compensate for the detected offset. Compensating for the detected offset can include adjusting the image so that the displayed center of the image is aligned with the user's central vision. Returning to the example of the baseball thrown toward the user in FIGS. 7E and 7F above, if the detected offset is +Z offset, as shown in FIG. 7E, then the image can be adjusted upward by an amount of +Z or a function of +Z, such as a proportion of +Z. The offset detection process of method operations 1100 can then be repeated to determine if the adjusted image reduced the detected offset to less than the preselected amount.

Additional uses of the detected offset can include saving the offset to the user's profile so as to allow the offset to be recalled whenever the user is using the HMD in an subsequent uses of the HMD. The offset value stored in the user's profile can be updated periodically or continually during use of the HMD. By way of example, the offset value can be initially recalled from the user's profile when the user begins a HMD use session and then a revised offset can be stored in the user's profile when the user's current HMD session is ended or even one or more times during the user's HMD session. It should be understood that to save the offset value to the user's profile, the HMD 102 and/or the gaming console and/or a gaming server must collect the user's identity and access the user's profile. In one implementation, the user's identity information can be obtained by data entry by the user or biometric data or combinations thereof.

In some embodiments, operations may include detecting an identity of the user. Identify may be detected by user entry of a password, voice detection, biometric detection, fingerprint detection, login user, access of a user account etc. Once the user is identified, the profile for the user can be accessed. The profile may be saved to a database, e.g., user database either locally or on a remote server. The profile, in one embodiment, saves the offset (and other corrected data or metadata) to be used to enable the correction, e.g., during a session of use of the HMD.

In one embodiment, a subsequent scene is associated with interactive content to be rendered on the HMD. For example, the subsequent scene may be of a game, an application, a tour, meeting, or multi-player interactivity.

In one embodiment, the scene or subsequent scene provides interactive content in a form of a game, an application, an advertisement, a program or combinations thereof.

In one embodiment, at least one corrective lens is used by the user when wearing the HMD, such that the user has the comfort viewing position set for when a pair of glasses are used.

In one configuration, the at least one corrective lens is a multi-focal lens and has a visible dividing line between a first vision correction in an upper portion of the lens and a second vision correction in a lower portion of the lens. The visible dividing line, for instance, can influence the directed orientation of the user when viewing the object.

In one embodiment, adjusting the positioning of the subsequent scene reduces the offset when viewing said certain objects. For example, the certain objects are objects that are a subject of interactive content rendered in the scene.

In one embodiment, the initial orientation of the HMD in three-dimensional space is of a real-world environment, and the real-world environment has a physical reference. The physical reference can be a direction of gravity, the ground, a table, a physical object in a room, a camera viewing the HMD or combinations thereof.

In one embodiment, a comfort viewing position is defined for the user viewing toward a direction that is in front of the user when wearing the HMD.

In one embodiment, an object in the scene is a graphical image that is identifiable from among a plurality of other graphical images. The graphical image may be a reticle superimposed over objects in the scene. Still further, the graphical image is an interactive object in the scene.

In some embodiments, the location in the scene is at a predefined coordinate on the screen (e.g., a center location, a side location, a top location, a bottom location, or a specific pixel coordinate location on a display screen or image rendered on a screen of an HMD when the user is viewing in a specific location during a specific point in time.

In one embodiment, the directed orientation has real-world coordinates in the three-dimensional space in which the HMD is located.

In some embodiments, a prompt is generated by a computing device that is interfaced with the HMD. The prompt is one of an audible prompt, a visual prompt or a combination of audible and visual prompt or can also include tactile feedback. In one embodiment, the prompt is generated during a calibration of the HMD for the user. In another embodiment, the prompt is generated during an interactive session with the HMD.

In one embodiment, a directed orientation is captured after a threshold period of time. The threshold period of time is after an expected period of time required to move from the initial orientation to view the location of the object. In still another configuration, the prompt includes a request to hold viewing of the object for a period of time.

In one example, the offset is associated with coordinates in real-world space and a reference in real-world. The offset may have a vertical offset parameter, or a horizontal offset parameter, or combinations thereof. The offset may also be measured from determined position changes detected by an inertial sensor in the HMD. Still further, the offset may be measured by detected images of the HMD captured by a camera that is directed to view movement of the HMD in one or more image frames captured by the camera. In still other configurations, the offset is measured by a combination of detected changes in inertial sensors of the HMD and images data captured of light emitting diodes of the HMD. Still further, the offset may be predefined for all users. Some users may be center reticle users, some users may be low reticle users, and others may be high reticle users. In this sense, the a reticle refers to the location that the user is directing the HMD to point towards. For instance, if the user is tilting the head back to view directly forward, the user is a high reticle user. In this case, the system can apply a predefined corrective offset. This configuration enables application of an offset for the user, without actual measurement.

Figure 12:
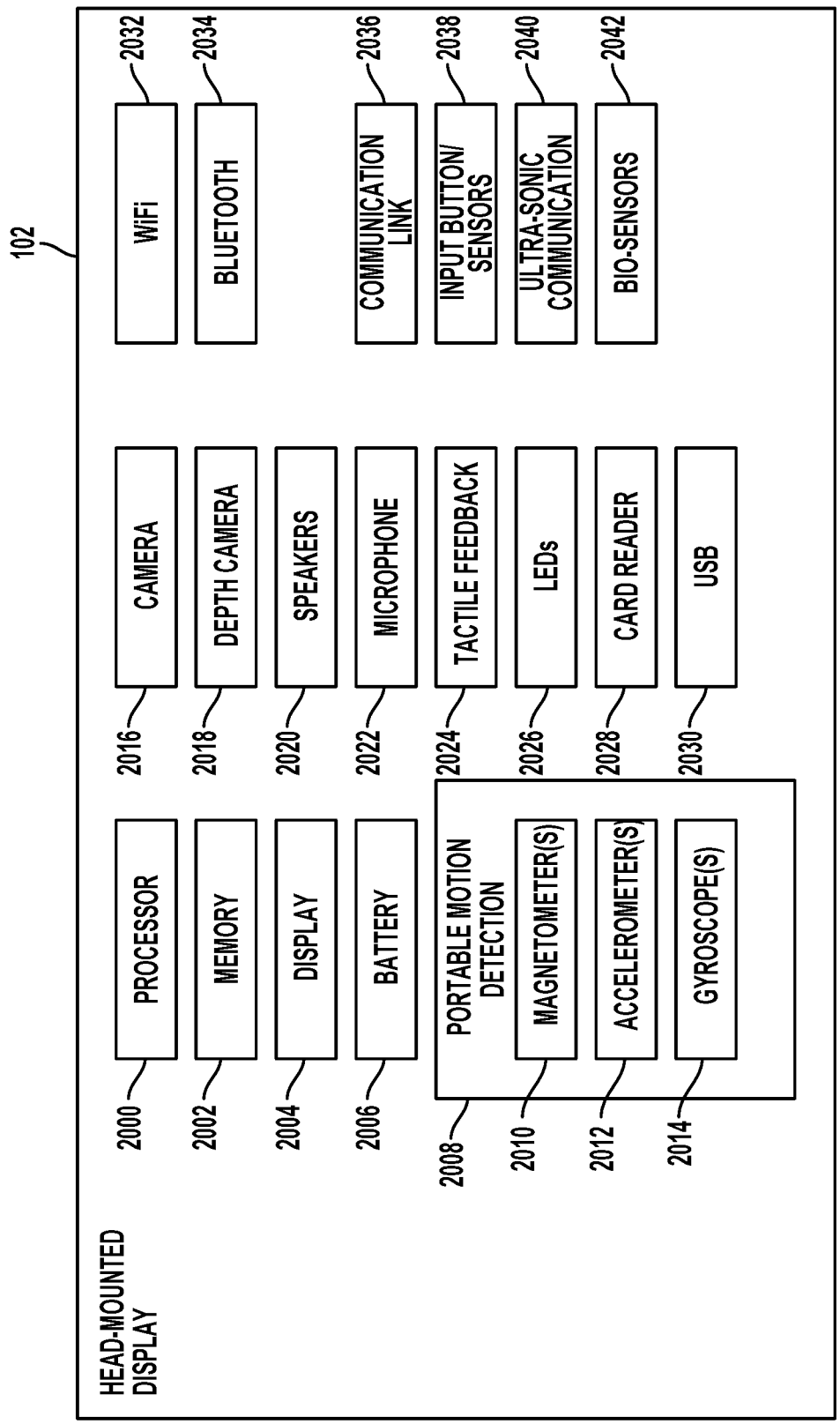
FIG. 12 is a diagram is shown illustrating example components of a head-mounted display, in accordance with the disclosed embodiments.

With reference to FIG. 12, a diagram is shown illustrating example components of a head-mounted display 102, in accordance with the disclosed embodiments. It should be understood that more or less components may be included or excluded from the HMD 102, depending on the configuration and functions enabled. The head-mounted display 102 may include a processor 2000 for executing program instructions. A memory 2002 is provided for storage purposes, and may include both volatile and non-volatile memory. A display 2004 is included which provides a visual interface that a user may view.

The display 2004 may be defined by one single display, or in the form of a separate display screen for each eye. When two display screens are provided, it is possible to provide left-eye and right-eye video content separately. Separate presentation of video content to each eye, for example, may provide for better immersive control of three-dimensional (3D) content. As described above, in one embodiment, the second screen 107 is provided with second screen content of the HMD 102 by using the output for one eye, and then formatting the content for display in a 2D format. The one eye, in one embodiment, may be the left-eye video feed, but in other embodiments it may be the right-eye video feed.

A battery 2006 may be provided as a power source for the head-mounted display 102. In other embodiments, the power source may include an outlet connection to power. In other embodiments, an outlet connection to power and a battery 2006 may be provided. A motion detection module 2008 may include any of various kinds of motion sensitive hardware, such as a magnetometer 2010, an accelerometer 2012, and a gyroscope 2014.

An accelerometer 2012 is a device for measuring acceleration and gravity induced reaction forces. Single and multiple axis (e.g., six-axis) models are able to detect magnitude and direction of the acceleration in different directions. The accelerometer is used to sense inclination, vibration, and shock. In one embodiment, three accelerometers 2012 are used to provide the direction of gravity, which gives an absolute reference for two angles (world-space pitch and world-space roll).

A magnetometer 2010 measures the strength and direction of the magnetic field in the vicinity of the head-mounted display. In one embodiment, three magnetometers 2010 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp may be calibrated using information from other sensors such as the gyroscope or the camera. In one embodiment, accelerometer 2012 is used together with magnetometer 2010 to obtain the inclination and azimuth of the head-mounted display 102.

A gyroscope 2014 is a device for measuring or maintaining position and pose, based on the principles of angular momentum. In one embodiment, three gyroscopes 2014 provide information about movement across the respective axis (x, y and z) based on inertial sensing. The gyroscopes help in detecting fast rotations. However, the gyroscopes may drift overtime without the existence of an absolute reference. This requires resetting the gyroscopes periodically, which may be done using other available information, such as position and pose determination based on visual tracking of an object, accelerometer, magnetometer, etc.

A camera 2016 is provided for capturing images and image streams of a real environment. More than one camera (optionally) may be included in the HMD 102, including a camera that is rear-facing (directed away from a user when the user is viewing the display of the HMD 102), and a camera that is front-facing (directed towards the user when the user is viewing the display of the HMD 102). Additionally, a depth camera 2018 may be included in the HMD 102 for sensing depth information of objects in a real environment.

The HMD 102 includes speakers 2020 for providing audio output. Also, a microphone 2022 may be included for capturing audio from the real environment, including sounds from the ambient environment, speech made by the user, etc. The HMD 102 includes tactile feedback module 2024 for providing tactile feedback to the user. In one embodiment, the tactile feedback module 2024 is capable of causing movement and/or vibration of the HMD 102 so as to provide tactile feedback to the user.

LEDs 2026 are provided as visual indicators of statuses of the head-mounted display 102. For example, an LED may indicate battery level, power on, etc. A card reader 2028 is provided to enable the head-mounted display 102 to read and write information to and from a memory card. A USB interface 2030 is included as one example of an interface for enabling connection of handheld peripheral devices, or connection to other devices, such as other portable devices, computers, etc. In various embodiments of the HMD 102, any of various kinds of interfaces may be included to enable greater connectivity of the HMD 102.

A WiFi module 2032 may be included for enabling connection to the Internet via wireless networking technologies. Also, the HMD 102 may include a Bluetooth module 2034 for enabling wireless connection to other devices. A communications link 2036 may also be included for connection to other devices. In one embodiment, the communications link 2036 utilizes infrared transmission for wireless communication. In other embodiments, the communications link 2036 may utilize any of various wireless or wired transmission protocols for communication with other devices.

Input buttons/sensors 2038 are included to provide an input interface for the user. Any of various kinds of input interfaces may be included, such as buttons, gestures, touchpad, joystick, trackball, etc. An ultra-sonic communication module 2040 may be included in HMD 102 for facilitating communication with other devices via ultra-sonic technologies.

Bio-sensors 2042 are included to enable detection of physiological data from a user. In one embodiment, the bio-sensors 2042 include one or more dry electrodes for detecting bio-electric signals of the user through the user's skin, voice detection, eye retina detection to identify users/profiles, etc.

The foregoing components of HMD 102 have been described as merely exemplary components that may be included in HMD 102. In various embodiments of the disclosure, the HMD 102 may or may not include some of the various aforementioned components. Embodiments of the HMD 102 may additionally include other components not presently described, but known in the art, for purposes of facilitating aspects of the present disclosure as herein described.

It will be appreciated by those skilled in the art that in various embodiments of the disclosure, the aforementioned handheld device may be utilized in conjunction with an interactive application displayed on a display to provide various interactive functions. The exemplary embodiments described herein are provided by way of example only, and not by way of limitation.

In one embodiment, clients and/or client devices, as referred to herein, may include head mounted displays (HMDs), terminals, personal computers, game consoles, tablet computers, telephones, set-top boxes, kiosks, wireless devices, digital pads, stand-alone devices, handheld game playing devices, and/or the like. Typically, clients are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to client or on a separate device such as a monitor or television.

Clients are optionally configured to support more than one game player. For example, a game console may be configured to support two, three, four or more simultaneous users (e.g., P1, P2, . . . Pn). Each of these users may receive or share a video stream, or a single video stream may include regions of a frame generated specifically for each player, e.g., generated based on each user's point of view. Any number of clients may be local (e.g., co-located) or are geographically dispersed. The number of clients included in a game system may vary widely from one or two to thousands, tens of thousands, or more. As used herein, the term "game player" or "user" is used to refer to a person that plays a game and the term "game playing device" is used to refer to a device used to play a game. In some embodiments, the game playing device may refer to a plurality of computing devices that cooperate to deliver a game experience to the user.

For example, a game console and an HMD may cooperate with the video server system to deliver a game viewed through the HMD. In one embodiment, the game console receives the video stream from the video server system and the game console forwards the video stream, or updates to the video stream, to the HMD and/or television for rendering.

Still further, the HMD may be used for viewing and/or interacting with any type of content produced or used, such video game content, movie content, video clip content, web content, advertisement content, contest content, gamboling game content, conference call/meeting content, social media content (e.g., posting, messages, media streams, friend events and/or game play), video portions and/or audio content, and content made for consumption from sources over the internet via browsers and applications and any type of streaming content. Of course, the foregoing listing of content is not limiting, as any type of content may be rendered so long as it may be viewed in the HMD or rendered to a screen or screen of the HMD.

Clients may, but are not required to, further include systems configured for modifying received video. For example, a client may be configured to perform further rendering, to overlay one video image on another video image, to crop a video image, and/or the like. For example, clients may be configured to receive various types of video frames, such as I-frames, P-frames and B-frames, and to process these frames into images for display to a user. In some embodiments, a member of clients is configured to perform further rendering, shading, conversion to 3-D, conversion to 2D, distortion removal, sizing, or like operations on the video stream. A member of clients is optionally configured to receive more than one audio or video stream.

Input devices of clients may include, for example, a one-hand game controller, a two-hand game controller, a gesture recognition system, a vision recognition system, a voice recognition system, a keyboard, a joystick, a pointing device, a force feedback device, a motion and/or location sensing device, a mouse, a touch screen, a neural interface, a camera, input devices yet to be developed, and/or the like.

A video source may include rendering logic, e.g., hardware, firmware, and/or software stored on a computer readable medium such as storage. This rendering logic is configured to create video frames of the video stream based on the game state. All or part of the rendering logic is optionally disposed within one or more graphics processing unit (GPU). Rendering logic typically includes processing stages configured for determining the three-dimensional spatial relationships between objects and/or for applying appropriate textures, etc., based on the game state and viewpoint. The rendering logic may produce raw video that is encoded. For example, the raw video may be encoded according to an Adobe Flash® standard, HTML-5, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a device. The video stream is characterized by a frame size and a frame rate. Typical frame sizes include 800×600, 1280×720 (e.g., 720 p), 1024×768, 1080 p, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, the client may be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, a cloud gaming server is configured to detect the type of client device which is being utilized by the user, and provide a cloud-gaming experience appropriate to the user's client device. For example, image settings, audio settings and other types of settings may be optimized for the user's client device.

Figure 13:
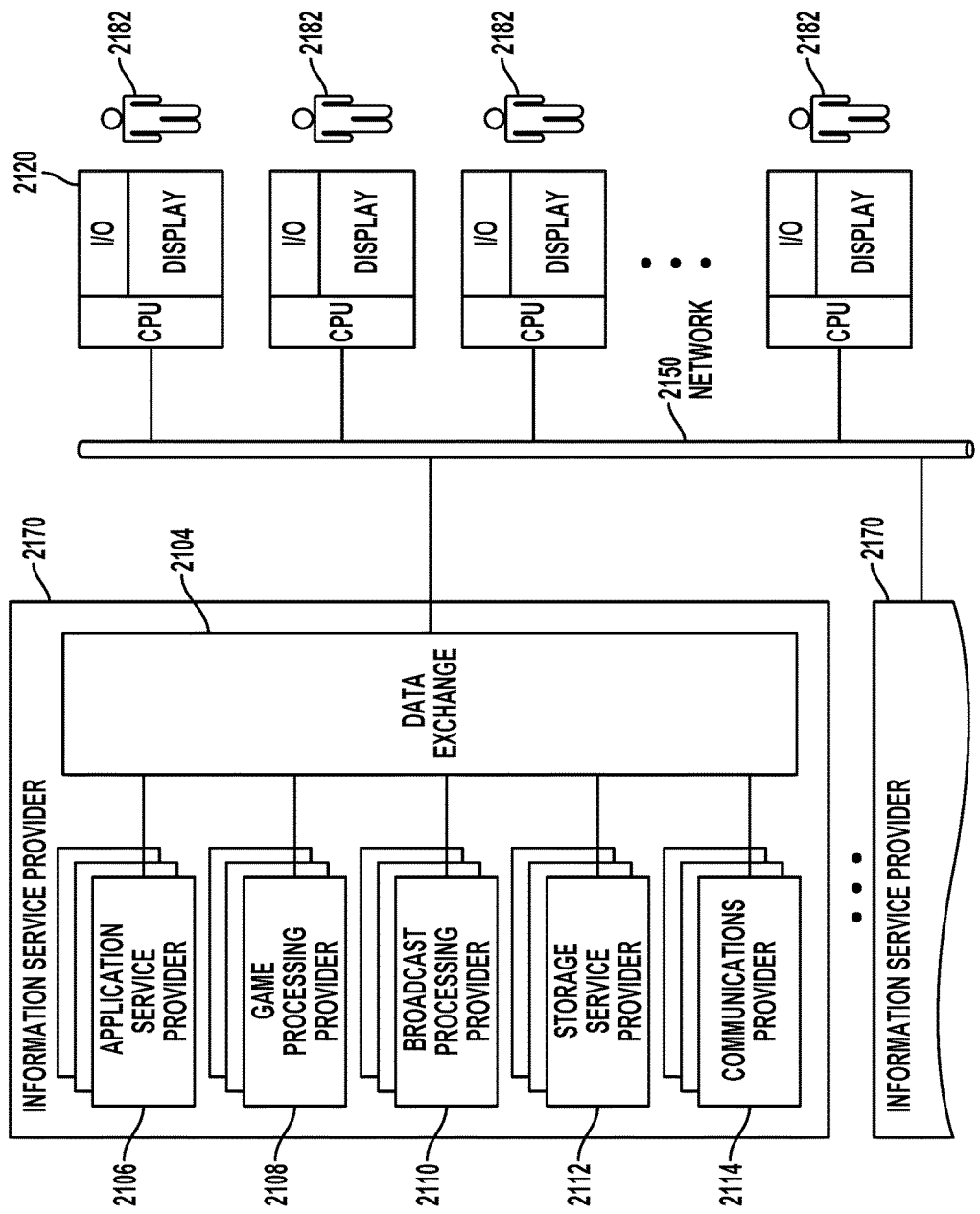
FIG. 13 illustrates an embodiment of an Information Service Provider architecture.

FIG. 13 illustrates an embodiment of an Information Service Provider architecture. Information Service Providers (ISP) 2170 delivers a multitude of information services to users 2182 geographically dispersed and connected via network 2150. An ISP may deliver just one type of service, such as stock price updates, or a variety of services such as broadcast media, news, sports, gaming, etc. Additionally, the services offered by each ISP are dynamic, that is, services may be added or taken away at any point in time. Thus, the ISP providing a particular type of service to a particular individual may change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 2170 includes Application Service Provider (ASP) 2106, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing may be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 2170 includes a Game Processing Server (GPS) 2108 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2110 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content may reach almost any country in the world.

Storage Service Provider (SSP) 2112 provides computer storage space and related management services. SSPs also offer periodic backup and archiving. By offering storage as a service, users may order more storage as required. Another major advantage is that SSPs include backup services and users will not lose all their data if their computers' hard drives fail. Further, a plurality of SSPs may have total or partial copies of the user data, allowing users to access data in an efficient way independently of where the user is located or the device being used to access the data. For example, a user may access personal files in the home computer, as well as in a mobile phone while the user is on the move.

Communications Provider 2114 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider may also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 2104 interconnects the several modules inside ISP 2170 and connects these modules to users 2182 via network 2150. Data Exchange 2104 may cover a small area where all the modules of ISP 2170 are in close proximity, or may cover a large geographic area when the different modules are geographically dispersed. For example, Data Exchange 2104 may include a fast Gigabit Ethernet (or faster) within a cabinet of a data center, or an intercontinental virtual area network (VLAN).

Users 2182 access the remote services with client device 2120, which includes at least a CPU, a display and I/O. The client device may be a PC, a mobile phone, a netbook, tablet, gaming system, a PDA, etc. In one embodiment, ISP 2170 recognizes the type of device used by the client and adjusts the communication method employed. In other cases, client devices use a standard communications method, such as html, to access ISP 2170.

Embodiments of the present disclosure may be practiced with various computer system configurations including hand-held devices, microprocessor systems, microprocessor-based or programmable consumer electronics, minicomputers, mainframe computers and the like. The disclosure may also be practiced in distributed computing environments where tasks are performed by remote processing devices that are linked through a wire-based or wireless network.

With the above embodiments in mind, it should be understood that the disclosure may employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The disclosure may also be embodied as computer readable code on a computer readable medium. The computer readable medium is any data storage device that may store data, which may be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium may include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications may be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method for optimizing positioning of a scene when displayed on a screen of a head mounted display (HMD), comprising:

detecting an initial orientation of the HMD in three-dimensional space, the initial orientation of the HMD being a comfort viewing position of a user, the initial orientation of the HMD being moved away from a real-world horizontal Z axis;

rendering an object in the scene, the rendering causing the object to be displayed at a location in the scene as displayed on the screen of the HMD;

detecting a directed orientation of the HMD in the three-dimensional space, the directed orientation being detected after the HMD is moved from the initial orientation by the user wearing the HMD in response to a prompt directing the user to view the object in the scene;

determining an offset in three-dimensional space between the initial orientation and the directed orientation, wherein a viewing direction of eyes of the user in both the initial orientation and the directed orientation remain substantially along the real-world horizontal Z axis while the offset is detected between the initial orientation and the directed orientation of the HMD; and saving the offset to a profile of the user, the offset being applied to adjust positioning of a subsequent scene when rendered for the user, such that certain objects in the subsequent scene are rendered on the screen to enable viewing of said certain objects proximate to the comfort viewing position of the user.

2. The method of claim 1, further comprising,
detecting an identity of the user; and
obtaining the profile for the user, the profile having the offset to be used during a session of use of the HMD.

3. The method of claim 1, wherein the subsequent scene is associated with interactive content to be rendered on the HMD.

4. The method of claim 1, wherein the scene or subsequent scene provides interactive content in a form of a game, an application, an advertisement, a program or combinations thereof.

5. The method of claim 1, wherein at least one corrective lens is used by the user when wearing the HMD, such that the user has the comfort viewing position set for when a pair of glasses are used.

6. The method of claim 5, wherein the at least one corrective lens is a multi-focal lens and has a visible dividing line between a first vision correction in an upper portion of the multi-focal lens and a second vision correction in a lower portion of the multi-focal lens, the visible dividing line influencing the directed orientation of the user when viewing the object.

7. The method of claim 1, wherein adjusting the positioning of the subsequent scene reduces the offset when viewing said certain objects.

8. The method of claim 1, wherein the certain objects are objects that are a subject of interactive content rendered in the scene.

9. The method of claim 1, wherein the initial orientation of the HMD in three-dimensional space is of a real-world environment, the real-world environment having a physical reference.

10. The method of claim 1, wherein the comfort viewing position is defined for the user viewing toward a direction that is in front of the user when wearing the HMD.

11. The method of claim 1, wherein the object in the scene is a graphical image that is identifiable from among a plurality of other graphical images.

12. The method of claim 11, wherein the graphical image is a reticle superimposed over objects in the scene.

13. The method of claim 11, wherein the graphical image is an interactive object in the scene.

14. The method of claim 1, wherein the location in the scene is at a predefined coordinate on the screen.

15. The method of claim 1, wherein the directed orientation has real-world coordinates in the three-dimensional space in which the HMD is located.

16. The method of claim 1, wherein the prompt is generated by a computing device that is interfaced with the HMD, the prompt being one of an audible prompt, a visual prompt or a combination of audible and visual prompt.

17. The method of claim 1, wherein the prompt is generated during a calibration of the HMD for the user.

18. The method of claim 1, wherein the prompt is generated during an interactive session with the HMD.

19. The method of claim 1, wherein the directed orientation is captured after a threshold period of time, the threshold period of time is after an expected period of time required to move from the initial orientation to view the location of the object.

20. The method of claim 1, wherein the prompt includes a request to hold viewing of the object for a period of time.

21. The method of claim 1, wherein the offset is associated with coordinates in real-world space and a reference in real-world.

22. The method of claim 1, wherein the offset has a vertical offset parameter.

23. The method of claim 1, wherein the offset has a horizontal offset parameter.

24. The method of claim 1, wherein the offset is measured from determined position changes detected by an inertial sensor in the HMD.

25. The method of claim 1, wherein the offset is measured by detected images of the HMD captured by a camera that is directed to view movement of the HMD in one or more image frames captured by the camera.

26. The method of claim 1, wherein the offset is measured by a combination of detected changes in inertial sensors of the HMD and images data captured of light emitting diodes of the HMD.

* * * * *